(12) United States Patent
Wiig

(10) Patent No.: US 7,430,483 B2
(45) Date of Patent: Sep. 30, 2008

(54) METHOD AND APPARATUS FOR DIAGNOSING A MECHANISM

(75) Inventor: Johan Wiig, Aix en Provence (FR)

(73) Assignee: Eurocopter, Marignane (FR)

( * ) Notice: Subject to any disclaimer, the term of this patent is extended or adjusted under 35 U.S.C. 154(b) by 78 days.

(21) Appl. No.: 11/527,403

(22) Filed: Sep. 27, 2006

(65) Prior Publication Data

US 2007/0260656 A1 Nov. 8, 2007

(30) Foreign Application Priority Data

May 5, 2006 (FR) .................................. 06 04084

(51) Int. Cl.
*G01R 13/00* (2006.01)
(52) U.S. Cl. .............................. 702/69; 702/34; 702/56; 701/100; 701/101; 701/102; 701/103; 701/104; 701/105; 701/106; 701/107; 701/108; 701/109; 701/110; 701/111; 73/579; 73/659; 73/660
(58) Field of Classification Search ................... 702/69, 702/34, 56; 701/100–111; 73/579, 659, 73/660
See application file for complete search history.

(56) References Cited

U.S. PATENT DOCUMENTS

| 6,301,572 | B1 | 10/2001 | Harrison |
| 6,768,938 | B2 * | 7/2004 | McBrien et al. ............. 701/100 |
| 2004/0034482 | A1 | 2/2004 | Gross et al. |
| 2004/0143398 | A1 | 7/2004 | Nelson |
| 2004/0176902 | A1 | 9/2004 | McBrien et al. |
| 2005/0096873 | A1 | 5/2005 | Klein |

FOREIGN PATENT DOCUMENTS

| EP | 0 407 179 | 1/1991 |
| EP | 0 838 048 | 4/1998 |
| EP | 0 843 244 | 5/1998 |
| WO | WO 97/03385 | 1/1997 |
| WO | WO 99/54703 | 10/1999 |

OTHER PUBLICATIONS

Brian D. Larder, "Helicopter HUM/FDR benefits and developments", American Helicopter Society 55th Annual Forum, Montreal, Quebec, 1999.
Paul Grabill et al., "Vibration monitoring techniques investigated for the monitoring of a ch-47d swashplate bearing", American Helicopter Society 59th Annual Forum, Phoeniz, Arizona, 2003.
Paul Samuel et al., "Helicopter transmission diagnostics using constrained adaptive lifting", American Helicopter Society 59th Annual Forum, Phoenix, Arizona, 2003.

* cited by examiner

*Primary Examiner*—Tung S Lau
*Assistant Examiner*—Sujoy K Kundu
(74) *Attorney, Agent, or Firm*—Young & Thompson

(57) ABSTRACT

A method of analyzing variations in an indicator of the behavior of a mechanism, in which noise is extracted, and any discontinuities from an indicator in order to obtain a trend, variations in the trend are compared with one or more reference values; and a fault of the mechanism is indicated as a function of the result of the comparison. Any outlier data in the indicated data are search for and subtracted, and any edge data are extracted from the data obtained from the search operation.

16 Claims, 14 Drawing Sheets

Fig.1A
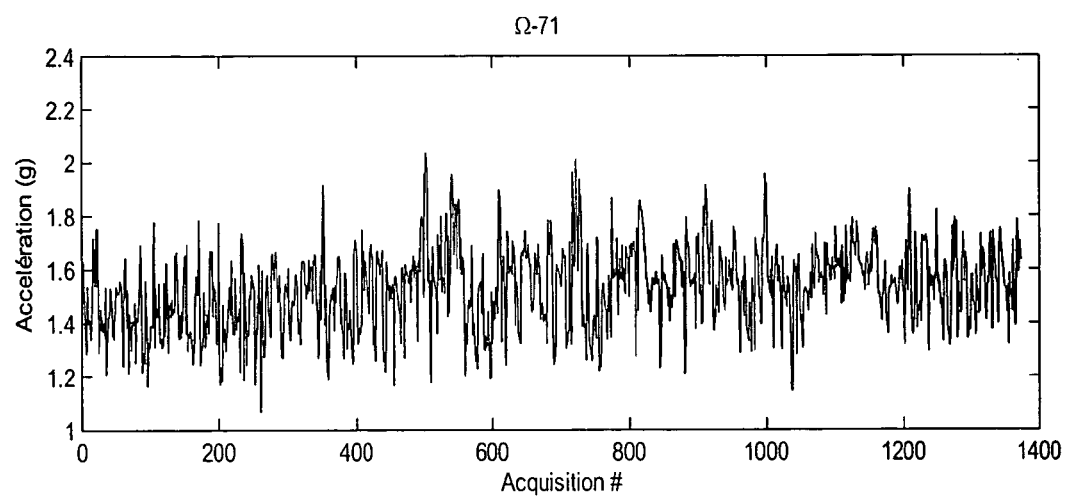
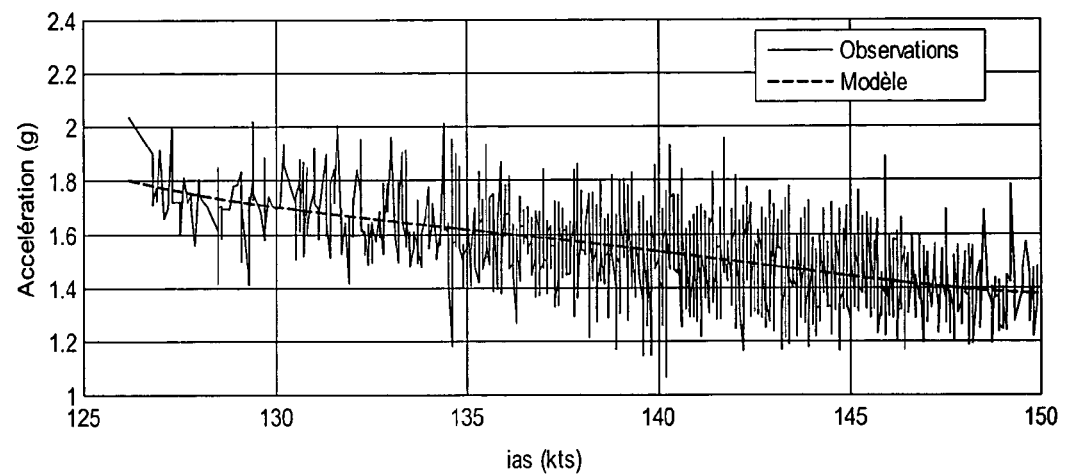
Fig.1B

Fig.10
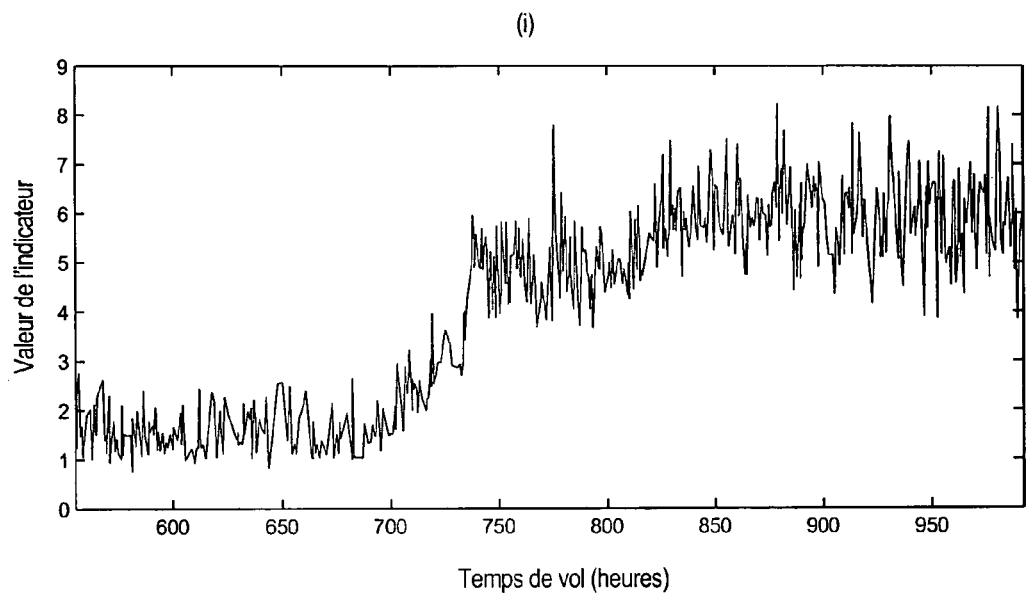
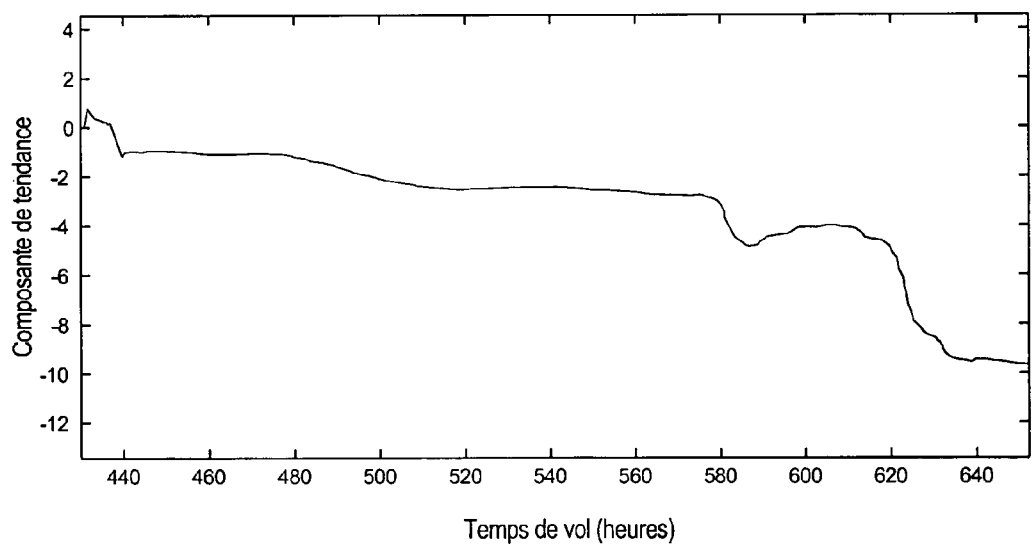
Fig.12

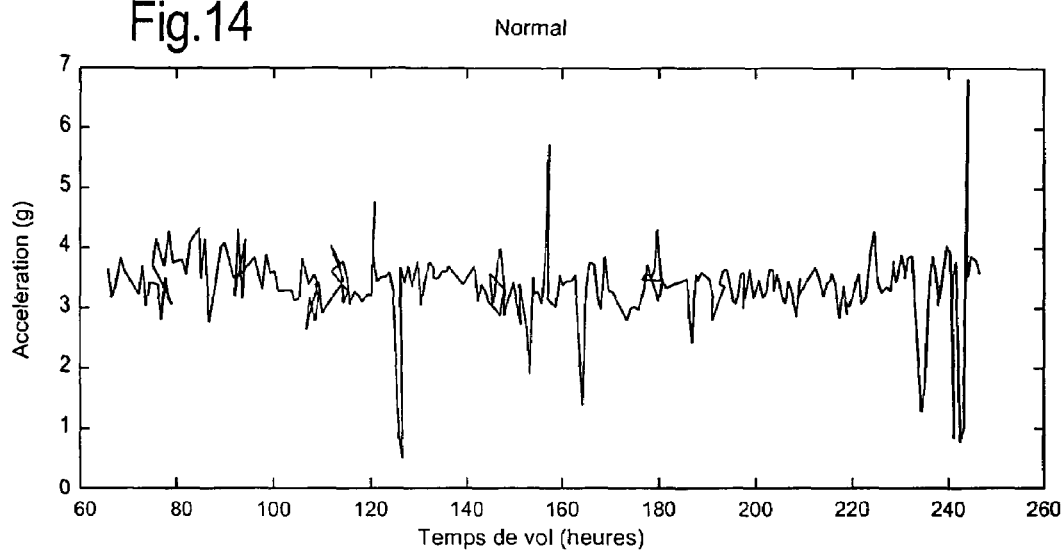
Fig.14 Normal
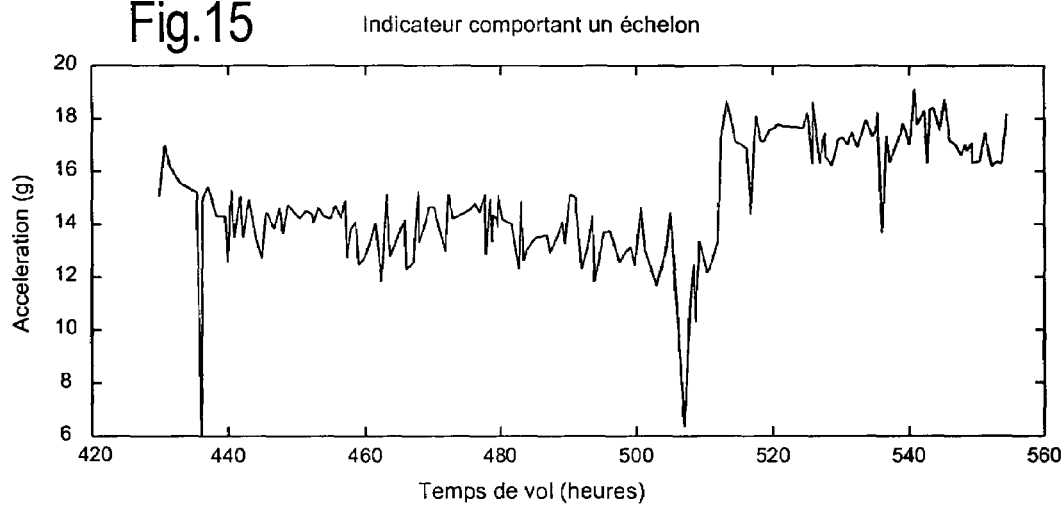
Fig.15 Indicateur comportant un échelon
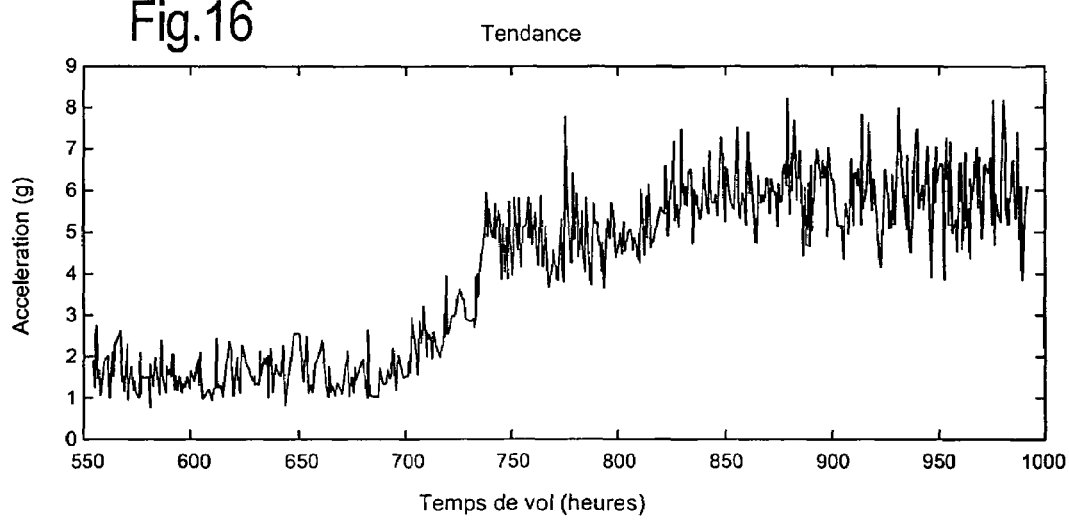
Fig.16 Tendance

METHOD AND APPARATUS FOR DIAGNOSING A MECHANISM

The present invention relates to a method of diagnosing a mechanism, to a mechanism diagnosis program, and to apparatus suitable for executing the program in order to implement the method.

The technical field of the invention is that of systems for monitoring the state of rotorcraft.

The invention applies in particular to diagnosis of a transmission mechanism inserted between at least one engine and at least one rotor of a rotorcraft.

Such a mechanism usually comprises a plurality of shafts fitted with gears and serves to transmit torque from the engine(s) of the rotorcraft to its rotor(s) and accessories.

Monitoring or detecting the appearance of a fault within a mechanism constitutes the subject matter of a large amount of research; mention can be made of patent document EP-0 838 048 relating to detecting failure of a sensor.

Certain aspects of monitoring the state of turbines or engines are described in particular in patent documents U.S. Pat. Nos. 6,301,572, 2004/0176902, and 2005/0096873.

Analyzing aircraft engine trend data for diagnostic purposes is described in patent document EP-0 843 244.

Patent document EP-0 407 179 and the document "Helicopter HUM/FDR benefits and developments" by Brian D. Larder, American Helicopter Society 55th Annual Forum, Montreal, Quebec, 1999, gives information concerning the monitoring of the state of a helicopter.

The document "Vibration monitoring techniques investigated for the monitoring of a ch-47d swashplate bearing" by Paul Grabill et al., American Helicopter Society 59th Annual Forum, Phoenix, Ariz., 2003, describes techniques used for detecting rolling bearing defects from vibratory data.

The document "Helicopter transmission diagnostics using constrained adaptive lifting", by Paul Samuel et al., American Helicopter Society 59th Annual Forum, Phoenix, Ariz., 2003, describes using a diagnostic algorithm for a helicopter transmission mechanism using wavelets; wavelets are used to adapt the algorithm to a defined mechanism; the wavelets are determined from vibratory data of a transmission in good condition and enable a model to be constructed for predicting the waveform of vibratory signals. The algorithm determines a prediction error during operation of the transmission, and the amplitude of the prediction error gives an indication on the existence of certain types of fault in gearing.

The present invention relates in particular to diagnosis of a helicopter power transmission mechanism by analyzing variations—over time—in indicators that are determined from vibration measurements performed on the helicopter, and/or by analyzing said vibration measurements.

In order to take the measurements, the helicopter is fitted with accelerometers which are placed (secured) to the motor(s), to the transmission gearbox case(s), to the shaft bearings, and/or to other points of the structure of the helicopter.

In flight, the signals delivered by the sensors are converted into data and where appropriate synchronized (using signals delivered by a rotation sensor) and/or "averaged" and then recorded on board the helicopter.

On return to the ground, the recorded data is correlated and analyzed.

Interpreting the data is complex: it requires lengthy intervention by an expert.

Known tools for automatically analyzing the data for the purpose of diagnosing mechanical faults in the transmission mechanism are incomplete and imperfect; faults that exist are not detected, whereas unjustified fault indications are sometimes generated by such analysis tools.

An object of the invention is to propose a method of analyzing such data, an analysis program, and apparatus including said program that enable diagnosis to be established that is reliable, i.e. maximizing the percentage of real defects that are detected and minimizing the percentage of unconfirmed defects.

An object of the invention is to propose such methods, programs, and apparatuses that do not require prior learning by the operator.

An object of the invention is to propose such methods, programs, and apparatuses that are improved and/or that remedy at least in part the shortcomings or drawbacks of previously-known methods, programs, and apparatuses.

According to an aspect of the invention, there is proposed a method of diagnosing a mechanism by analyzing vibration measurements taken from the mechanism and/or by analyzing variations in an indicator signal (i) concerning the behavior of the mechanism, the method comprising the following successive operations:

normalizing (correcting) variations in the indicator with reference to simultaneous variations in an operating parameter (PA) of the mechanism, in particular with reference to simultaneous variations in the indicated air speed (ias) of the rotorcraft;

determining reference values or thresholds for the rate of variation of the indicator (i) or of at least one of its components (w, b, s, c) from the variations in the indicator during a period in which the mechanism is operating without fault; and then comparing the rate of variation of the indicator (i) or of at least one of its components (w, b, s, c) with the reference values or thresholds.

The normalization operation may include filtering indicator variation data. This operation may include a parametric model of the indicator or of measurements from which the indicator is extracted.

The mechanism may be a transmission mechanism of a rotorcraft, the indicator may be derived from synchronous analysis of variation measurements on the rotorcraft in flight, and the operating parameter (PA) may be the air speed (ias) of the rotorcraft.

In another aspect of the invention, there is proposed a method of analyzing variations in an indicator (i) of the behavior of a mechanism, the method comprising the following operations:

(OP1, OP2) extracting noise (w) and any discontinuities (b, s) from the indicator (i) in order to obtain a trend (c);

(OP8) comparing variations in the trend (c) with one or more reference values; and (OP10) indicating a fault of the mechanism as a function of the result of the comparison(s) (OP8).

In preferred implementations of the invention:

in order to extract any discontinuities, the following operations are performed: (OP1) searching for and subtracting out any outlier data (s) in the indicator data (i); and (OP2) extracting any edge data (b) from the data (i-s) obtained from operation (OP1);

in order to find the times of the outlier data (s), a moving median value (mm(i)) of the indicator data is subtracted from the indicator data (i) in order to obtain noisy data (i'), and the time(s) is/are identified for which the ratio of the amplitude of the noisy data (i') to the indicator data level (wrms(i)) is greater than a threshold (ts);

in order to identify the presence of an edge (b) in the data (i-s), variations in the scale coefficients (d') corresponding to a wavelet transform of variations in the data (i-s) are analyzed;

a potential edge (b) is identified in the data (i-s) when the ratio $b_p$ of a mean (abs(mean(d'))) of the sale coefficients to the standard deviation (std(d')) of the variations of these coefficients (d'), exceeds a first determined value $t_p$, and when the ratio $b_m$ of said mean (abs(mean(d'))) of the scale coefficients to the level (wrms(i-s)) of the data ($i_1$=i-s) exceeds a second determined value $t_m$;

in order to compare the trend variations with reference values, the following operations are performed, (OP5) calculating scale variation data of a wavelet transform of the trend data (c), and (OP8) comparing the scale variation data of the wavelet transform of the trend data with reference values;

the following operations are also performed: (OP3) calculating the level (wrms(w)) of the noise (w); (OP7) comparing variations in the level (wrms(w)) of the noise with one or more reference values; and (OP9) indicating a fault of the mechanism as a function of the results of the comparison(s) performed in operation (OP7);

in order to compare variations in the noise level (wrms) with reference values, the following operations are performed, (OP4) calculating scale variation data of a wavelet transform of the noise level variations (wrms (w)), and (OP7) comparing the scale variation data of the wavelet transform of the noise level (wrms(w)) with the reference values;

use is made of the Haar wavelet and of the scale function associated with the Haar wavelet;

when an edge is detected, the time of the edge is compared with historical data concerning maintenance of the mechanism;

the amplitude of the data (i-s) is compared (OP9) with at least one third reference value; and a fault of the mechanism is diagnosed as a function of the results of the comparisons.

According to yet another aspect of the invention, apparatus is proposed for diagnosing a mechanism as a function of data (i) obtained from variation measurements performed on the mechanism, which apparatus is programmed to perform the operations of a method of the invention.

According to yet another aspect of the invention, there is proposed a program for diagnosing a mechanism as a function of data (i) obtained from variation measurements performed on the mechanism, the program being characterized in that it is arranged (structured and organized) to perform the operations of a method of the invention.

The program may be arranged to perform the following operations:

(OP1) searching for and separating out any outlier data (s) in the data (i);

(OP2) extracting noise data (w) and any edge data (b) from the data (i-s) obtained from operation (OP1), in order to obtain trend data (c);

(OP3) calculating noise level data (wrms(w)) from the noise data;

(OP4) calculating data concerning the rate of variation of the noise level data over time;

(OP5) calculating data concerning the rate of variation of the trend data over time;

(OP6) generating edge detection data, and where applicable calculating an edge time from the edge data, and comparing the edge time with historical data concerning mechanism maintenance;

(OP7) comparing the rate of variation data for the noise level data over time with first reference values;

(OP8) comparing the rate of variation data for the trend data over time with second reference values;

(OP9) comparing the amplitude of the data (i-s) obtained at the end of operation (OP1) with at least one third reference value; and (OP10) generating data indicative of a fault being detected in the mechanism as a function of the results of the comparisons (OP6, OP7, OP8, OP9).

The data (i) generated from the vibration measurements taken on the mechanism during a period of use of the mechanism may correspond in particular to variations:

in the acceleration (energy) level measured on the mechanism at a synchronization frequency (i.e. a frequency of rotation of an element of the mechanism), or a multiple of said frequency; or in the acceleration level measured on the mechanism in a frequency band; or in an indicator of the degree of flattening of a spectrum of the vibratory measurements, such as a kurtosis.

Other aspects, characteristics, and advantages of the invention appear from the following description which refers to the accompanying drawings that show preferred implementations of the invention, without any limiting character.

FIG. 1A is a graph showing the variations in an indicator ($\Omega$-71) for a gearwheel of a rotorcraft transmission, as a function of time.

FIG. 1B is a graph showing firstly variations in the same indicator as a function of the speed of the rotorcraft, and secondly a polynomial model of the influence of speed on said indicator.

FIG. 10 is a graph showing variations in a second indicator, and

FIG. 12 is a graph on a larger scale showing variations over time in the trend component (c) of the first indicator of FIG. 9D.

FIG. 14 is a graph showing variation over time in an indicator for a signal without fault.

FIG. 15 is a graph showing variation over time in an indicator for a signal during a period that includes an act of maintenance that has led to an edge in the indicator.

FIG. 16 is a graph showing variation over time in an indicator for a signal representative of the appearance of a mechanical fault.

Figure 17:
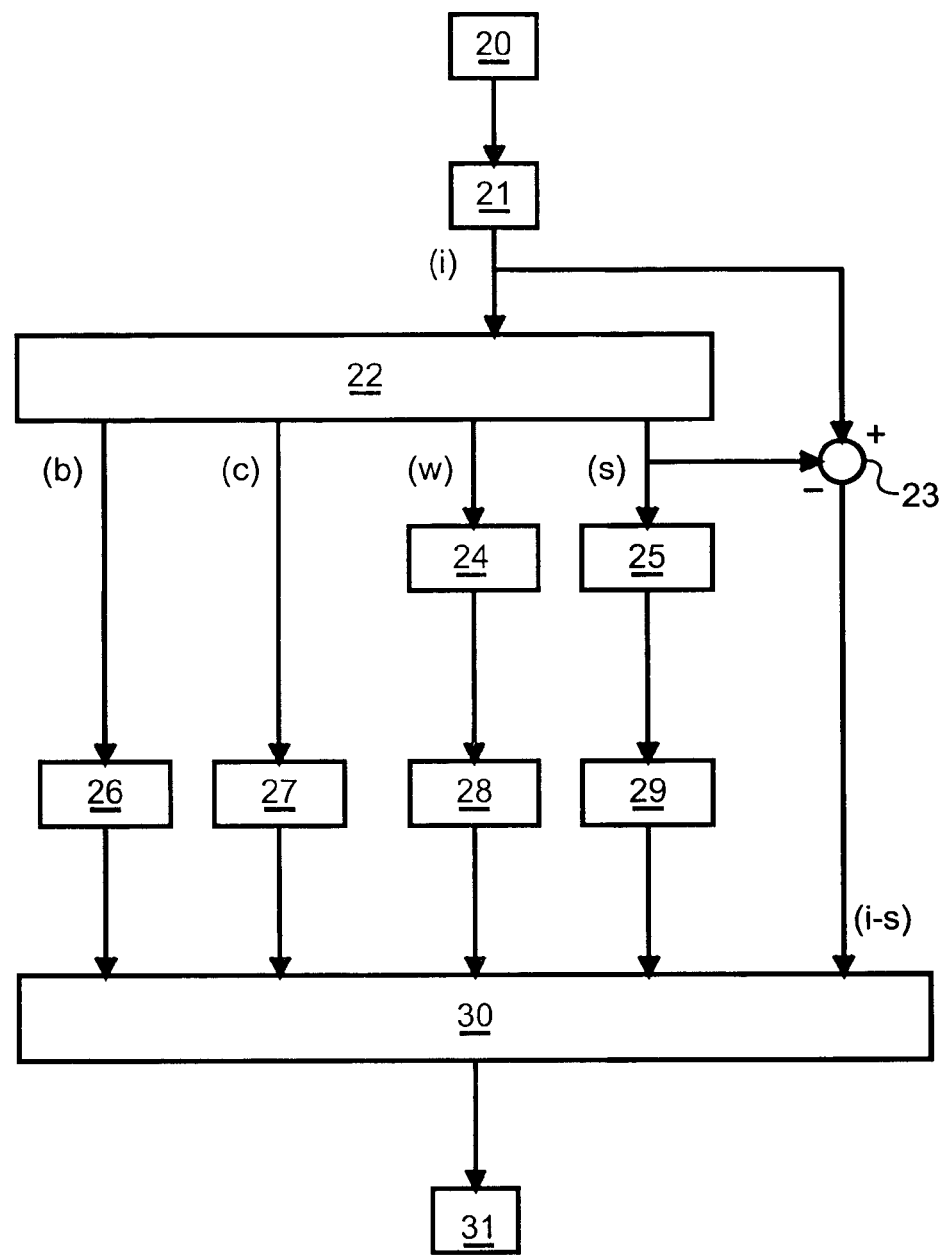
FIG. 17 is a block diagram showing the organization of the main modules of apparatus programmed to implement the operations of a method of the invention.

With reference to FIG. 17, the apparatus of the invention comprises a module 20 for reading data and having its output connected to the input of a module 21 for correcting context variations, to which module 21 the data for analysis is thus directed.

The corrected indicator or signal (i) delivered at the output from the module 21 is directed to a module 22 for separating the following components: interference (s), noise (w), edge (b), and trend (c), and also to an adder 23 which subtracts the interference (s) from the indicator.

The data for each of the components (b) and (c) is analyzed by a respective module 26 or 27 for calculating rates of variation in the values of these components and delivering results to an analysis module 30.

The respective levels of each of the components (w) and (s) are calculated respectively by two level calculation modules 24 and 25 which deliver their respective results to a module 28 for calculating the rate of variation in noise level and to a module 29 for calculating the frequency at which interference appears; in a simplified implementation, the modules 25 and 29 for processing interference can be omitted.

Figure 18:
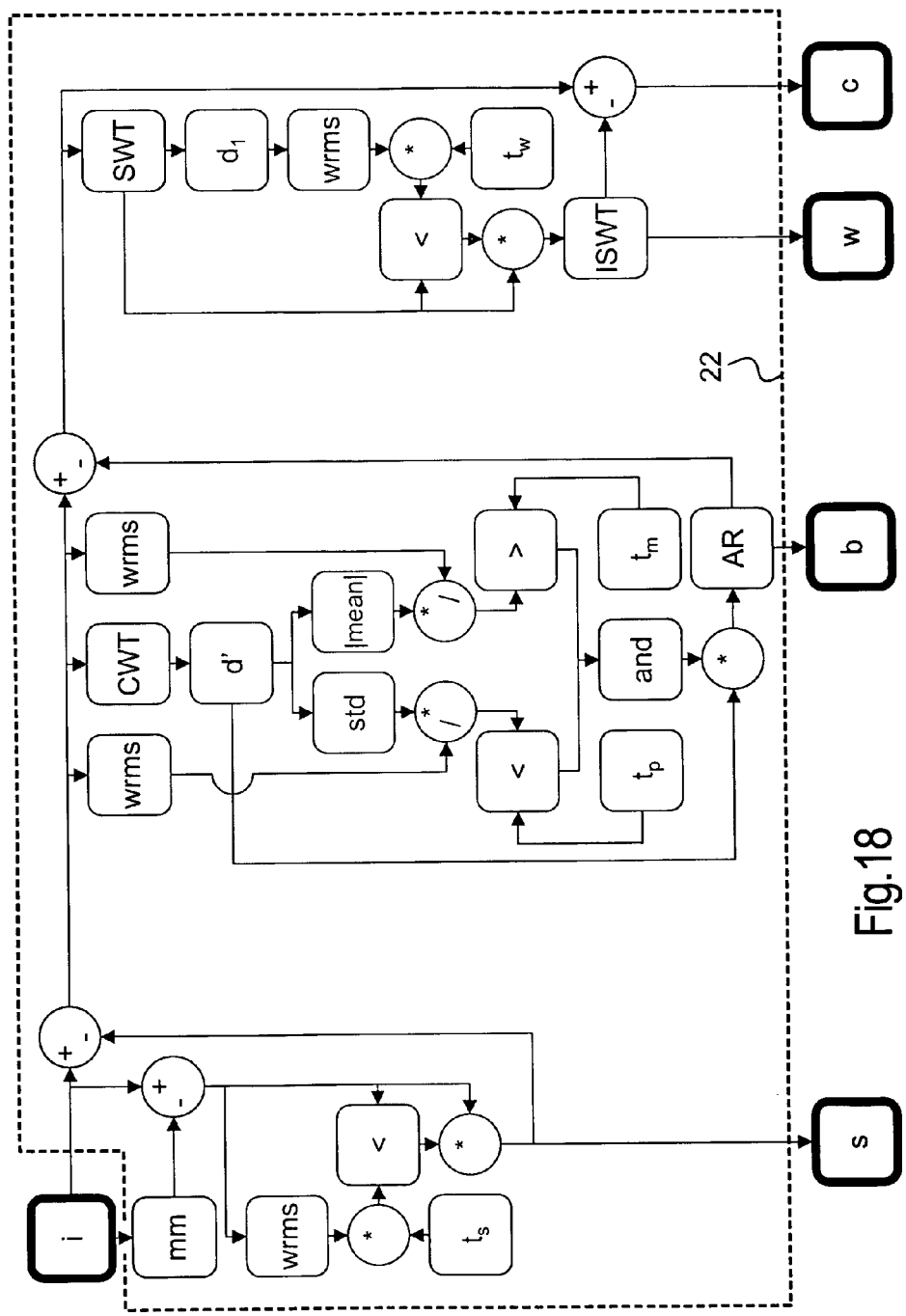
FIG. 18 is a diagram showing the organization of a module for separating four components of an indicator for analysis, forming part of the apparatus of the invention as shown in FIG. 17.

Thus, the module 22 performs the operations OP1 and OP2 that are shown in detail in FIG. 18, while the modules 24, 27, and 28 respectively perform the operations OP3, OP5, and OP4. The analysis module 30 compares (operations OP6 to OP9) the data delivered by the modules 26 to 29 with thresholds; the results of these comparisons can be delivered to a human by a display and/or alarm device 31.

These operations are described in detail below.

Notation

In an implementation of the invention, moving medians are used to eliminate or extract a portion or component corresponding essentially to interfering or deviant data ("outliers") from a signal, i.e. time variation data of an indicator, by filtering. Calculating the moving median is analogous to filtering.

The median of K successive values of the data $\underline{x}$ up to the value having index $\underline{n}$ is written mm(x,n,K):

$$mm(x,n,K) = \text{median}_{k=n-K}^{n}[x(k)] \quad \{\text{equation 1}\}$$

A windowed root mean square (RMS) is used to estimate the energy of a portion of a signal corresponding to a sequence or "window" of consecutive data points. A windowed RMS of length K of a signal of length N gives a length result M=N−K.

The RMS value of K successive values of the data point $\underline{x}$ up to the item of index $\underline{n}$ is written "wrms(x,n,K)" where:

$$wrms(x, n, K) = \frac{1}{K} \sum_{k=n-K}^{n} (x(k) - \overline{x})^2, \quad \{\text{equation 2}\}$$

where $\overline{x}$ is the mean of x.

Some of the principles and notation involved in wavelet transforms are briefly outlined below. In wavelet theory, a signal f(t) can be represented as a weighted sum of functions $\psi_{j,k}(t)$ (cf. equation 3). The (integer) subscripts $\underline{j}$ and $\underline{k}$ represent scaling (i.e. expansion or contraction) and shifting of a wavelet basis function $\psi_{j,k}(t)$ or basis wavelet (cf. equation 4). The particular $\psi_{j,k}(t)$ selected depends on the application. For the purposes of eliminating noise and performing compression, it is possible to select a wavelet that confines the noise and the meaningful portion of the signal under analysis in different portions of the coefficient matrix $d_{j,k}$ (cf. equation 5). In order to detect an event, it is possible to select a wavelet that gives an easily-recognized signature to the event.

$$f(t) = \sum_{j,k} d_{j,k} \Psi_{j,k}(t) \quad \{\text{equation 3}\}$$

$$\psi_{j,k}(t) = 2^{\frac{j}{2}} \psi(2^j t - k) \quad \{\text{equation 4}\}$$

$$d_{j,k} = \langle f(t), \Psi_{j,k}(t) \rangle \quad \{\text{equation 5}\}$$

For a signal of finite length, a matrix of finite length is obtained in the shift dimension (k). Since the number of possible scales (j) is infinite, signal reconstruction would require coefficients to be calculated for an infinite number of scales.

The discrete wavelet transform (DWT) overcomes that difficulty by expanding using only a limited number of scale coefficients/functions, with the remaining portion of the signal f(t) forming an approximation vector $a_k$. In this way, the coefficient matrix $d_{j,k}$ and the approximation vector $a_k$ together contain all of the information needed for reconstructing the original signal (cf. equation 6). The number of scales should be selected so that an appropriate separation is obtained of the characteristics of the analyzed signal between the approximation vector and the scale vectors of the coefficient matrix:

$$f(t) = \sum_{k} a_k \phi(t-k) + \sum_{j,k} d_{j,k} \psi_{j,k}(t) \quad \{\text{equation 6}\}$$

The wavelet function $\psi(t)$ and the associated scale function $\phi(t)$ must be orthogonal (cf. equation 7):

$$\langle \psi(t), \phi(t) \rangle = 0 \quad \{\text{equation 7}\}$$

Consequently, the DWT can be calculated only by using a mother wavelet function for which there exists an orthogonal scale function.

In practice, it is possible to use a bank of dyadic filters (h, $h_1$) derived from the wavelet and scale functions (cf. equation 8 and equation 9):

$$\phi(t) = \sum_n h(n)\sqrt{2}\,\phi(2t-n) \quad \{\text{equation 8}\}$$

$$\psi(t) = \sum_n h_1(n)\sqrt{2}\,\phi(2t-n) \quad \{\text{equation 9}\}$$

This forms a system of recursive equations in which the initial approximation vector is the function to be transformed: $a_{j0}=f(t)$ (cf. equation 10 and equation 11). The input to any scale $a_j$ is the result of the preceding approximation.

$$d_{j,k} = \sum_n h_1(n-2k) a_{j+1,n} \quad \{\text{equation 10}\}$$

$$a_{j,k} = \sum_n h(n-2k) a_{j+1,n} \quad \{\text{equation 11}\}$$

Reconstruction (equation 12) of the signal begins by using an approximation vector and the coefficient matrix $d_{j,k}$ of lower level in order to reconstruct the approximation of higher level. A recursive algorithm makes it possible to obtain the original coefficients $a_{j0}$. Consequently, only the lowest level approximation vector and the entire matrix of coefficients are needed for reconstructing the original input (signal).

$$a_{j+1,k} = \sum_n h(k-2n) a_{j,n} + \sum_n h_1(k-2n) d_{j,n} \quad \{\text{equation 12}\}$$

The 2k shift factor of the filters comes from the factor 2 relating the scales (cf. equation 4). Thus, each scale factor has half as many coefficients as the preceding scale factor. Consequently, the total number of coefficients is equal to the number of input samples independently of the number of iterations. By conserving only coefficients of high value, a reconstruction of reasonable precision can be obtained by using only a portion of the starting coefficients. By reducing coefficients representing noise to zero, the reconstruction makes it possible to obtain a signal (an input) that has been de-noised.

In order to eliminate noise from a signal (an input), the best results are often obtained by using a stationary wavelet transform (SWT). An SWT differs from a DWT by the fact that the coefficients of even order (2k) and the coefficients of odd order (2k+1) are extracted and processed separately. This creates redundancy since each layer (j)—or level of detail in the coefficient matrix $d_{j,k}$—produces the same number of coefficients as the input signal. This leads to better time precision (k) for the high scale coefficients corresponding to high values of index j. During reconstruction, the contributions of each set of redundant coefficients are merely averaged.

In order to conserve a length (or number of measurements i) for the signal output by the filter that is identical to the length at the input to the filter, and in order to minimize transients, the signal measurements taken can be padded out at the beginning and at the end. The additional measurements may comprise samples having the mean value of a determined number of the first/last samples in the signal. This can give better results than periodic padding (circular convolution), particularly when the start and end signals present different amplitudes.

Normalizing/Correcting Analysis Data or Signals

The acquisitions recorded during the operation of a mechanism, in particular during operation in flight of a power transmission mechanism in a helicopter, are affected by a certain number of contributing factors (operating and/or environment parameters). In general, an observed signal $\underline{x}$ of finite length recorded during a time period going from $\underline{t}$ to t+d can be considered as the product of models $M_k$, each depending on an (optionally linear) combination parameters $p_N^{(k)}$ (cf. equation 13). When the parameters vary during the recording period "d", at least some of the components of the signal may vary because of the repercussion at the outputs of these models of variations in these (operation and/or environment) parameters.

$$x(t) = \prod_k M_k(p_1^{(k)}, \ldots, p_N^{(k)}) \quad \{\text{equation 13}\}$$

To simplify, it can be considered that the parameters do not change in significant manner throughout a—single—recording period. This assumption is valid in most circumstances for recordings of short duration such as acquiring levels of variation on bearings. For monitoring measurements on gearing and a shaft, which are averaged over at least two hundred revolutions of the shaft, the duration of the period $\underline{d}$ is long and the parameters can drift. Acquisitions while monitoring gearing and shafts can be subjected to synchronous averaging in order to reduce random noise all along the acquisition period. This means that the signals are subdivided into windows each representing one shaft rotation, and sampled again so that each window has the same length, and then averaged. If one of the models drifts significantly during the recording period, the signal $\underline{x}$ may not be periodic with the shaft rotation, and a convergence calculation integrated with an algorithm for calculating the average can lead to the acquisition being rejected.

Consequently, the signal $\underline{x}$ can be considered, with minor loss of precision, as being the product of models that depend on parameters recorded at the beginning of the acquisition.

This expression can be further simplified by taking into consideration only the influence by the state of the associated component Mc of the mechanism, and the environment factors Me (cf. equation 14). Fault detection consists in estimating Mc, normally after a training stage, using a normal state E, and comparing consecutive observations with the model.

$$x(t) = M_c(E(t)) \cdot M_e(p_1, \ldots, p_N) \quad \{\text{equation 14}\}$$

The influence of the environment Me is the result of the environment at the time of acquisition. Each acquisition is accompanied by a set of context parameters describing said environment. These parameters may be flight data such as the indicated air speed of the helicopter, the torque transmitted by the transmission mechanism, or the lubricating oil temperature of the mechanism. Thus, Me depends on these context parameters p1(t) to pN(t).

For a set of signals $x_n(t)$ of finite length, where $\underline{t}$ represents the time (date) at the beginning of the acquisition and $\underline{n}$ represents the number of samples in each acquisition resulting from measurements on a component of state E that is stable throughout the acquisition, the output from the model Mc is constant. Consequently, the only factor contributing to the variations of xn(t) over time $\underline{t}$ is Me. The function Me can be estimated from the signal xn(t) and the context parameters on which Me depends, providing the necessary context parameters are recorded.

In order to eliminate the effect of changes in environment, a reference environment must be defined, and each observation needs to be corrected in order to make it appear to have been made in the reference environment. Thus, a correction function (cf. equation 15) delivers for each observation, the ratio of the influence Me of the environment at the moment of the observation to the influence Me of the reference environment. By multiplying each observation by the correction function $G_e$, Me is thus decorrelated from the observation so that the observation appears to have been made in the reference environment.

$$G_e(p_1(t), \ldots, p_N(t)) = \frac{M_e(p_1(ref), \ldots, p_N(ref))}{M_e(p_1(t), \ldots, p_n(t))} \quad \{\text{equation 15}\}$$

Modeling an Indicator

Indicators of the Ω-kz type are generally used as state indicators for gearing. These are simple spectral amplitude pointers in which Ω is the angular frequency of the shaft carrying the gearing, z is the number of teeth of the gearing under consideration, and k is an integer greater than zero. In this notation, the dash is a multiplication sign. These indicators represent the energy of the vibratory signal at the meshing frequency (Ωz) or at multiples (k) of said frequency, and they are correlated with the state E of the gearing. Such indicators can be influenced by the torque being transmitted by the gearing, and indirectly by the indicated air speed (ias) of the rotorcraft. The indicated air speed is used below to explain variations in the indicator values and in the vibration signature. Naturally, the methods described can be used with other operating parameters of the mechanism or with combinations of a plurality of operating parameters.

A plurality of indicators can be calculated from a set of signals x of finite length. If the state E of the associated gearing is constant for the data set corresponding to the signals, then any variation in the value of an indicator during the time t must be the result of Me. FIG. 1A shows by way of example variations in an indicator "Ω-71" associated with the state of a bevel pinion (having 71 teeth) in a helicopter transmission mechanism during successive acquisitions, while FIG. 1B shows the variations in the same indicator as a function of the indicated air speed at the time of acquisition. Any trend in a graph showing variations in the indicator "Ω-71" (i.e. the signal x) as a function of time ought to mean that the state E of the mechanical component associated with said indicator is varying over time, i.e. that the state of the associated component is being degraded. The graph of FIG. 1A does not show any variation trend, whereas the graph of FIG. 1B shows a clear decreasing variation trend. This shows that there exists a relationship between the indicator Ω-71 and the indicated air speed ias without there being any significant correlation between the indicated air speed and time.

The dashed-line curve in FIG. 1B represents a polynomial approximation for the influence Me(ias) (cf. equation 16) of the speed ias on the indicator Ω-71. A matrix P is made from a column vector of ias measurements in which each column of P contains the same ias column at a different power. An order 4 polynomial model was used in this example:

$$P(ias) = [ias^0(t), ias^1(t), ias^2(t), ias^3(t), ias^4(t)]$$

The vector â of the coefficients of the model contains the weight of each power. The variable e is the error of the model, i.e. the difference between the result given by the model and the observed value. The estimate of the model (cf. equations 16 and 17) is obtained by inverting the matrix P and by multiplying the values (i) by the observed indicator.

$$\hat{M}_e(ias) = \hat{a}P(ias) - e \quad \{\text{equation 16}\}$$

$$\hat{a} = (PP^T)^{-1}P^T i \quad \{\text{equation 17}\}$$

The indicator correction function is given below (cf. equation 18), and provides the correction factor for each indicator observation. Multiplying each indicator data point or value with the correction factor given by the corresponding indicated air speed decorrelates the indicator values from the indicated air speed, as though all of the indicators were the result of measurements performed in the selected reference environment.

$$\hat{G}(ias) = \frac{\hat{M}_e(ref)}{\hat{M}_e(ias)} \quad \{\text{equation 18}\}$$

Modeling a Signal

Certain indicators, such as those described in the above-mentioned document "Helicopter transmission diagnostics using constrained adaptive lifting" or in the document "Nearest neighbor-time series analysis classification of faults in rotating machinery", Journal of Vibration, Acoustics, Stress and Reliability in Design, 105: 178-184, 1983, are more complex than the simple spectrum indicators discussed above. Those methods make use of a reference wavelet/filter as an approximation of the signal, and they calculate the distance between each signal sample and the reference. Once a scalar characteristic has been extracted, it is no longer possible to make a correction.

Under such circumstances, it is necessary to correct the raw signal directly, and/or to create a model that describes the incidences of the environment on the waveform of the signal. This can be done by evaluating the power spectral density (PSD) of the signal as a function of significant environment factors, for example as a function of the indicated air speed (cf. FIG. 3 where frequency is related to the speed of rotation of a shaft). This data was acquired on board a helicopter in slow cruising flight. From the recorded vibratory data, a non-parametric PSD is obtained by a discrete Fourier transform, the signals previously being averaged in the time domain. The amplitude and the phase of the PSD thus form a representation of the signal in the time domain without loss of information.

Figure 2:
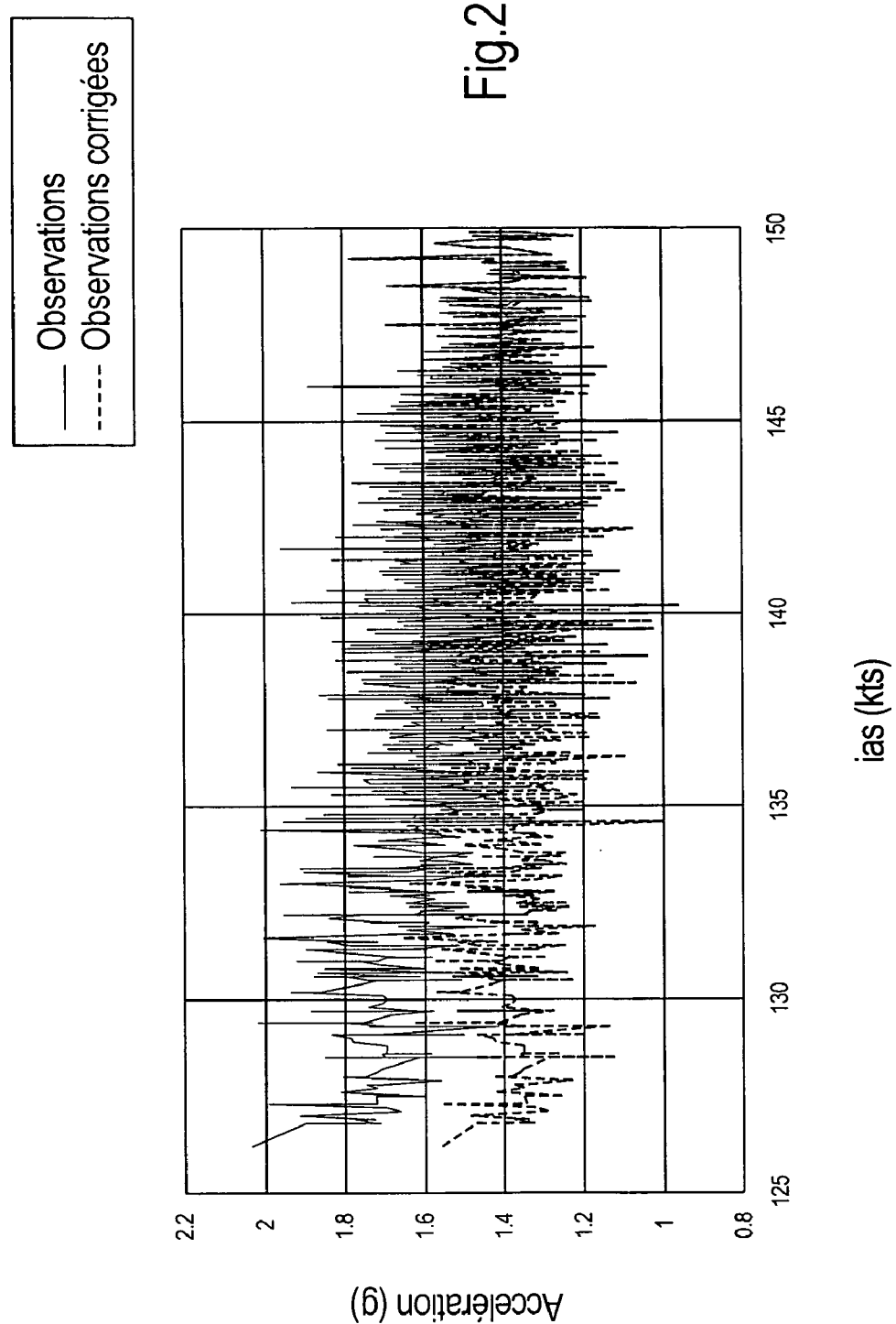
FIG. 2 is a graph showing variations as a function of time in the indicator of FIGS. 1A and 1B, both before (upper curve) and after (lower curve) correction for the influence of speed on said indicator, still as a function of the speed (ias) of the rotorcraft.
Figure 3:
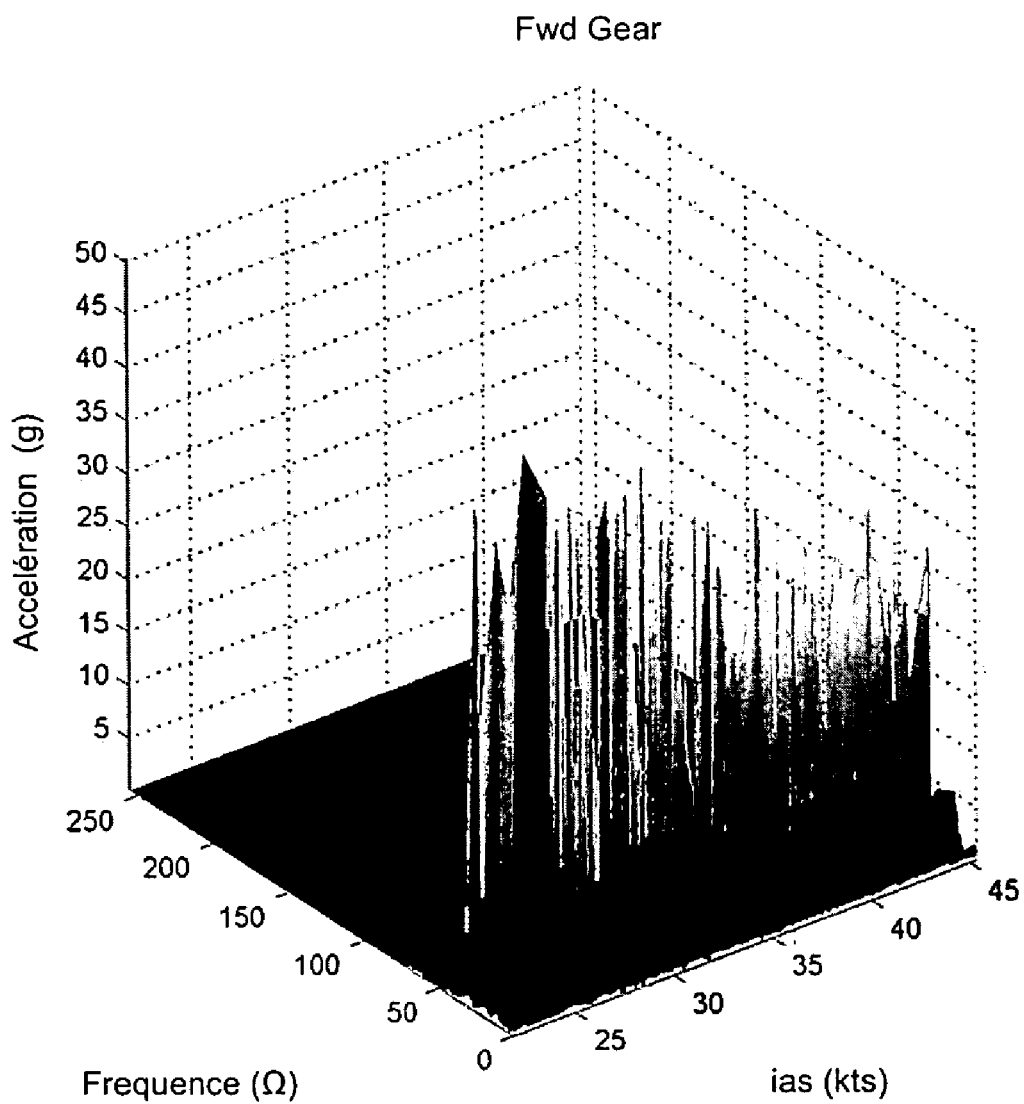
FIG. 3 is a graph showing variations in the power spectral density (PSD) level of a signal as a function of the frequency of rotation of a shaft of a rotorcraft transmission and as a function of the indicated air speed of the rotorcraft ("raw" indicator or signal).

In order to model the spectral behavior as a function of indicated air speed, it is necessary to establish an approximation for the PSD of the signal using a parametric model. As shown in FIG. 3, the graph of the PSD of the gearing vibration signals includes a high level/energy region corresponding to the recording harmonics and to the modulation side bands, above a background noise level. A spectrum of this form can be approximated validly by an autoregressive (AR) model (cf. equation 19). The frequency corresponding to a pole k of the AR model is written $\omega_k$, while the corresponding energy level is written $r_k$, and the overall level is written $b_0$. All of the complex poles must have a complex conjugate, otherwise the output from the model is complex.

$$H(\omega) = \frac{b_0}{1 + \prod_{k=0}^{k=K-1} r_k e^{j\omega_k} e^{-j\omega}} \quad \{\text{equation 19}\}$$

The level of the high energy region of the graph varies with indicated air speed, while its position on the frequency axis remains constant. In order to prevent a pole going to zero or to Π for distortions without significant energy at the recording frequency, $\omega_k$ is defined explicitly for each component and only $b_0$ and $r_k$ are optimized. Traditional parametric estimators such as linear prediction coefficients (LPC) can not be used for this purpose.

The parameters $b_0$ and $r_k$ of the model are then modeled by context parameters. A modified AR model is defined (cf. equations 20 and 21) for which each pole has a complex conjugate. This modification is possible since no acquisition presents harmonics of the meshing frequency, nor modulation side bands at a frequency of zero or Π.

$$H^{(ias)}(\omega) = \frac{b_0^{(ias)}}{1 + \prod_{k=0}^{k=K-1} z_k^{(ias)} e^{-j\omega} z_k^{*(ias)} e^{-j\omega}} \quad \{\text{equation 20}\}$$

$$z_k^{(n)} = r_k^{(n)} e^{j\omega_k^{(n)}} \quad \{\text{equation 21}\}$$

The number K of complex conjugate poles is selected to coincide with the number of high energy regions, and the pole angles $\omega_k$ are selected to correspond to the frequencies of these regions. The parameters $b_0$ and $r_k$ can be estimated by using a "trust region" algorithm. This estimate can also be performed by using an evolutionary algorithm, or by using other filter-estimation methods such as those based on a gradient. By estimating each signal $X^{(ias)}(\omega)$ in the data set, the corresponding approximation $H^{(ias)}(\omega)$ is obtained, given by $b_0^{(ias)}$ and $r_k^{(ias)}$:

$$H^{(ias)}(\omega) = X^{(ias)}(\omega) - E^{(ias)}(\omega) \quad \{\text{equation 22}\}$$

Figure 4:
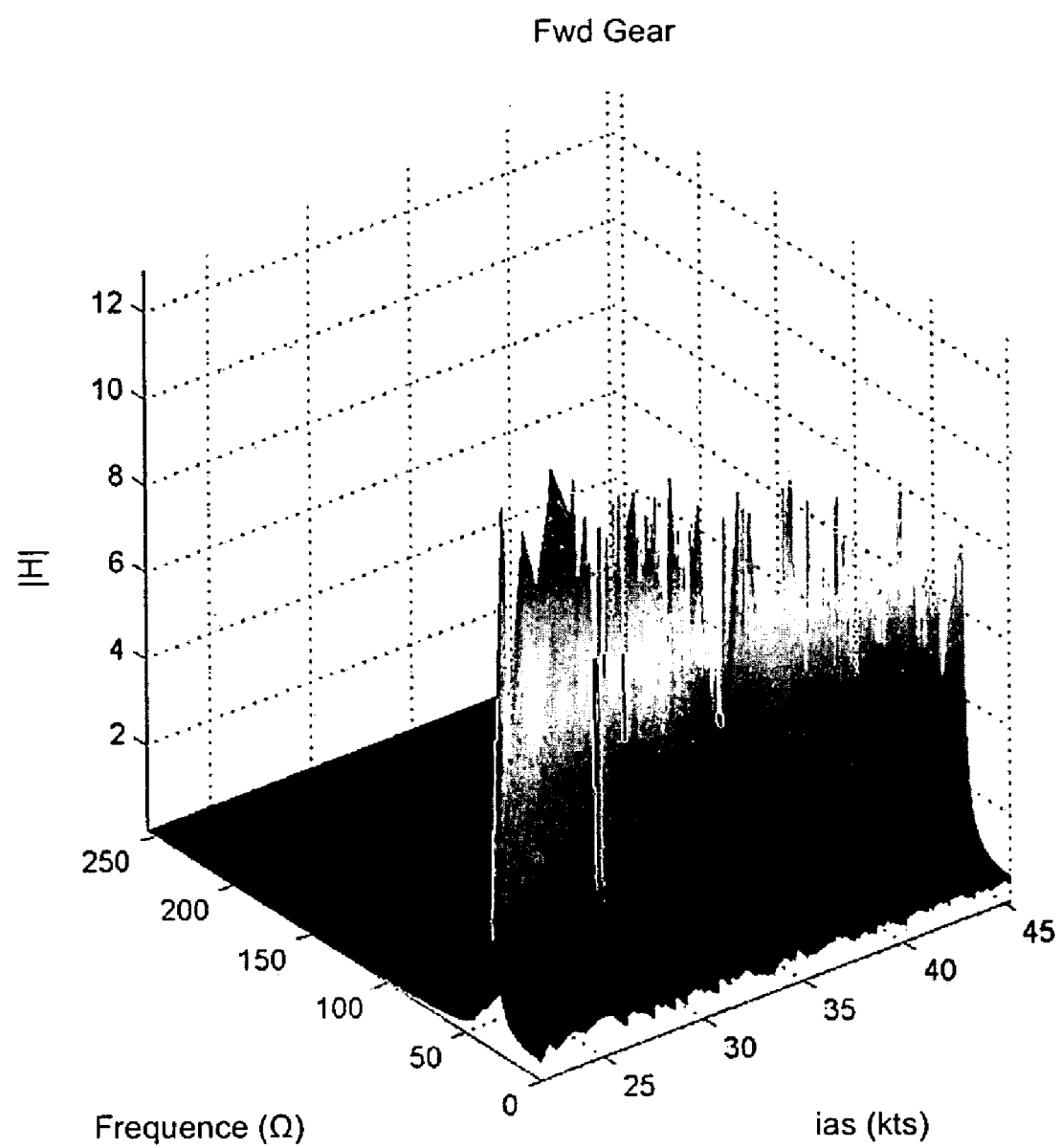
FIG. 4 is a graph showing the corresponding variations in a parametric model $H^{(ias)}(\omega)$ of variations in the signal shown in FIG. 3 as a function of the frequency of rotation $\omega$; this frequency simplification model is applied to obtain an approximation that serves to eliminate dispersion or irregularities due to frequency noise.

FIG. 4 shows an example of the amplitude of the signal modeled by $H^{(ias)}(\omega)$. The parameters $b_0^{(ias)}$ and $r_k^{(ias)}$ defining a model can themselves be modeled by polynomials.

Figure 5:
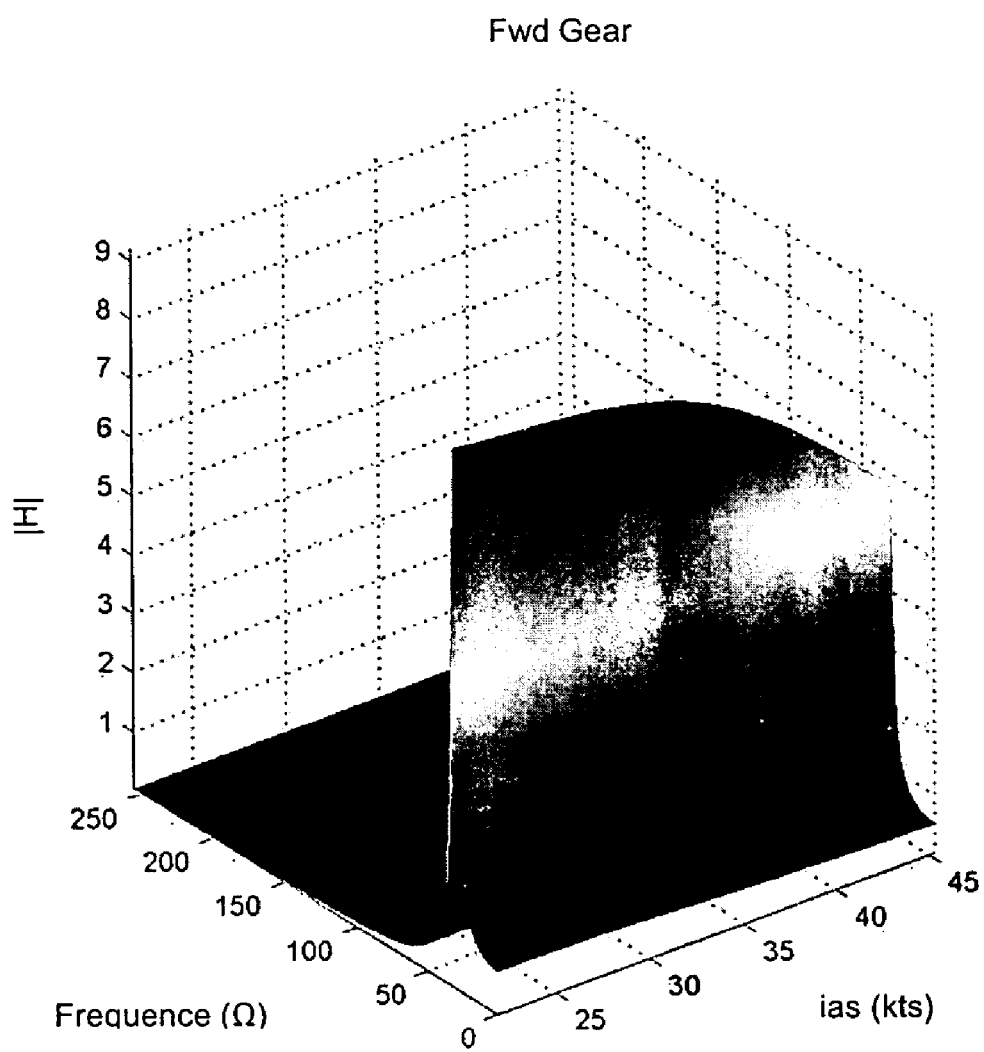
FIG. 5 is a graph showing the corresponding variations in a model $\hat{H}^{(ias)}(\omega)$ in frequency and in speed (ias) obtained from the model $H^{(ias)}(\omega)$ for the FIG. 3 signal.

By replacing the parameters $b_0^{(ias)}$, $r_k^{(ias)}$, and $\omega^{(ias)}$ by their polynomial approximations $\hat{b}_0^{(ias)}$, $\hat{r}_k^{(ias)}$, and $\hat{\omega}^{(ias)}$, a model $\hat{H}^{(ias)}(\omega)$ is obtained for the energy of the signal as a function of frequency and of indicated air speed, as shown in FIG. 5 and corresponding to equation 23 below:

$$\hat{H}^{(ias)}(\omega) = \frac{\hat{b}_0^{(ias)}}{1 + \prod_{k=0}^{k=K-1} \hat{z}_k^{(ias)} e^{-j\omega} \hat{z}_k^{*(ias)} e^{-j\omega}} \quad \{\text{equation 23}\}$$

In order to correct the signals, a reference indicated air speed (ref) is selected. The correction filter $G^{(ias)}(\omega)$ corresponds to the ratio between the reference power spectrum and the power spectrum corresponding to an arbitrary indicated air speed. Because of the division of two autoregressive filters, the correction filter is an autoregressive moving mean.

$$G^{(ias)}(\omega) = \frac{\hat{H}^{(ref)}(\omega)}{\hat{H}^{(ias)}(\omega)} \quad \{\text{equation 24}\}$$

$$\hat{H}^{(ias)}(\omega) = \frac{\hat{b}_0^{(ref)}\left(1 + \prod_{k=0}^{k=K-1} \hat{z}_k^{(ias)} e^{-j\omega} \hat{z}_k^{*(ias)} e^{-j\omega}\right)}{\hat{b}_0^{(ias)}\left(1 + \prod_{k=0}^{k=K-1} z_k^{(ias)} e^{-j\omega} z_k^{*(ias)} e^{-j\omega}\right)} \quad \{\text{equation 25}\}$$

Figure 6:
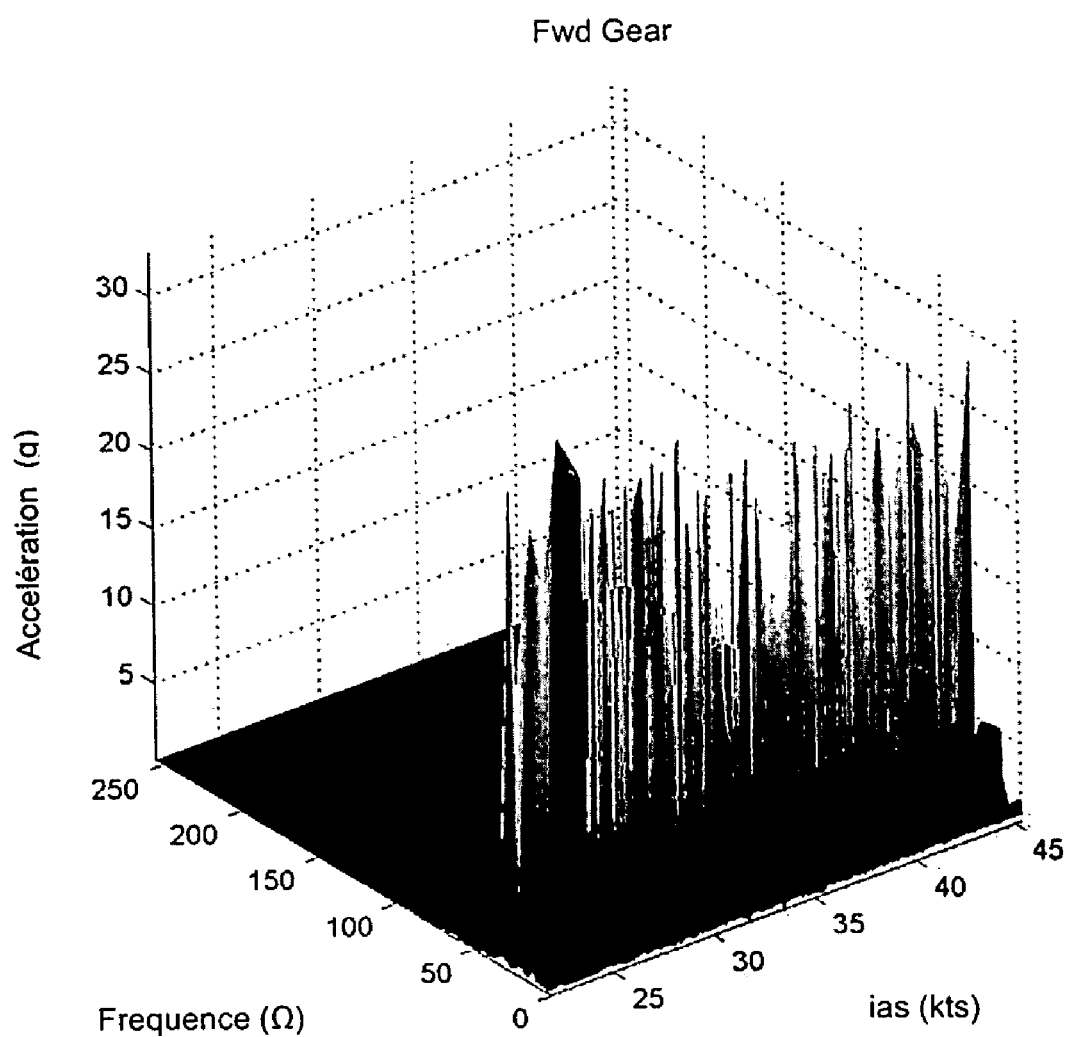
FIG. 6 is a graph showing the corresponding variations in the same filtered signal.

When the correction model $G^{(ias)}(\omega)$ is multiplied by the indicated air speed model $\hat{H}^{(ias)}(\omega)$, the reference power spectrum is obtained for all speed values ias. The coefficients $b_k$ and $a_k$ of the filter in the time domain for a given speed ias are the coefficients corresponding to the polynomials of the numerator and of the denominator of $\hat{G}^{(ias)}(\omega)$. Calculating a correction filter from the indicated air speed associated with each portion of a signal, and filtering the signal prior to subsequent transformation, serves to eliminate a large part of the influence of indicated air speed on the signal (cf. FIG. 6 showing a signal as filtered in this way).

This method of decorrelating the power spectrum amplitude of a signal from the travel speed of the helicopter does not take the phase of the power spectrum into consideration: the correction filter can lead to significant phase deformation. Where appropriate, the data may be processed by a phase equalizer for correcting the phase shifts caused by the signal amplitude corrector.

The correction/normalization methods proposed above contribute to correcting the influence of the environment on the vibration data, such that the data acquired with different environment conditions is more easily comparable, thereby increasing the overall reliability of the system.

Separating Signal Sources (or Components)

In order to eliminate noise from a data set, it is often assumed that the observed values i(n) are the sum of a deterministic process d(n) plus a random process w(n). In accordance with an aspect of the invention, a monitoring indicator i(n) is subdivided into four portions or components: a discontinuity component s(n); a random noise component w(n); an edge/step component b(n); and a trend component c(n):

$$i(n) = s(n) + w(n) + b(n) + c(n) \quad \{\text{equation 27}\}$$

The values of the discontinuity component, which lie completely outside the normal range for data, are easily identifiable. Such discontinuities typically result from sensor defects or, in the context of in-flight measurement, from flying at an inappropriate regime during the acquisition of the vibratory signals. Mechanical deterioration can also lead under certain circumstances to an increase in the frequency of such deviant measurements or "outliers".

The random noise component is a dispersion around the general trend of the indicator. Since this noise component is a broadband component, it is more difficult to isolate it and eliminate it. An increase in the random noise energy can be the result of mechanical deterioration.

An edge—or bias—in the signal is introduced so that the starting point of the component c(n) in equation 27 is always equal to zero. The value of this initial bias is the initial value of the indicator, after the components s(n) and w(n) have been subtracted therefrom. The bias represents the value of the data set in the normal state, such that any non-zero value for the component c(n) corresponds to a departure from the normal state.

When a major maintenance operation is performed on the mechanism under analysis, the value of the normal state of the indicator can vary. This variation then corresponds to an edge (or step) in the data set. Under such circumstances, the value of b(n) must also vary in order to reflect the change of the normal state level.

The operations OP1 and OP2 of subdividing an indicator (i) into four components (b, c, w, s) are shown diagrammatically in FIG. 18 and they are described in detail below.

Operation OP1: Separating Deviant Data (Outliers)

The trend of the data set (i) is removed by eliminating the moving median of the data with a window of dimension Ls. The moving median removes the component (s) and a portion of the component (w) while conserving intact the major portions of the components (c) and (b). The modified data set (i') consequently contains the component (s), a portion of the component (w), and small portions of the components (c) and (b):

$$i'(n)=i-mm(i,n,L_s) \quad \{\text{equation } 28\}$$

Since the modified data contains a small contribution in terms of trend or edge, its mean is substantially zero. A discontinuity is defined as being one such modified data point (i') for which the standard deviation exceeds the mean of the data set. A windowed average is used since signal fluctuation can vary over time:

$$s(n) = i'(n)\left(\frac{\text{abs}[i'(n)]}{wrms[i,n,L_s]} > t_s\right) \quad \{\text{equation } 29\}$$

Before proceeding to separate out the components (w), (b), and (c), the discontinuous component s(n) corresponding to the deviant data is subtracted from the indicator data:

$$i_1(n)=i(n)-s(n) \quad \{\text{equation } 30\}$$

Operation OP2: Separating Out One or More Edges

In order to detect edges, the data series of the indicator $i_1(n)$ is expanded (extended) by the Haar wavelet (cf. equation 31) using equation (5) with scale factors −1 to −J.

$$\psi(t)=\delta(t)-\delta(t-1) \quad \{\text{equation } 31\}$$

For an input data sample of length N, expanded by factors (−1) to (−J), the transform produces a matrix D of coefficients $d_{i,j}$ and of dimensions J×N. The information conveyed by a wavelet coefficient matrix depends on the wavelet selected. For the Haar wavelet, the coefficients correspond to the numerical derivative—i.e. the rate of variation—of the data set at different scales. Thus, the vector $d_j$ contains the mean derivative of the data set across a sliding window of $2^j$ points.

Trends correspond to slow variations in the phenomena (signals) and they are isolated in the layers of the matrix F that have a index j. The presence of random noise in the higher scales is negligible compared with the energy of trends. The only component having a significant impact at all scales is an edge. The effect of a unit amplitude edge at a given scale is $d_{i,j}=2^{j/2}$.

Figure 7:
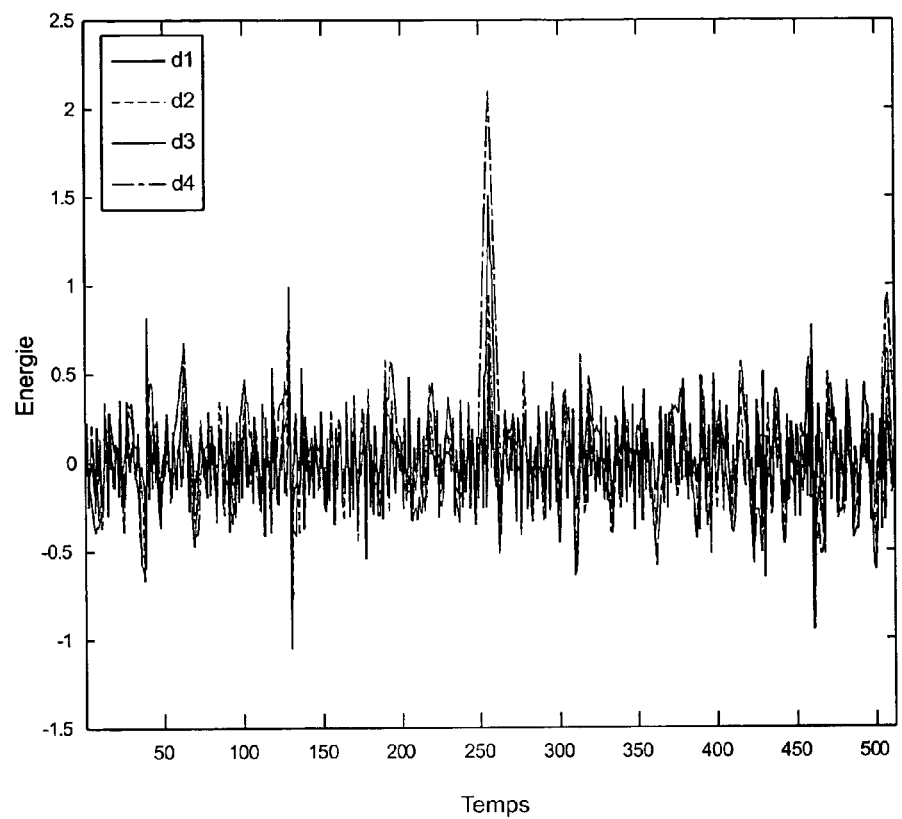
FIG. 7 is a graph showing variations in four scale factors d1 to d4 associated with a wavelet transform of an indicator.

Consequently, an edge can be identified by looking for the signature of an edge through all the scales (cf. FIG. 7). A modified matrix of coefficients $d'_{j,n}$ is calculated (cf. equation 32) to determine the amplitude of an edge. An edge of amplitude A and position p produces a modified matrix whose coefficients satisfy: $d'_{j,p}$=A for all values of j.

$$d'_{j,n} = 2^{\frac{-j}{2}} d_{j,n} \quad \{\text{equation } 32\}$$

By using the above definition, an edge is a position in time n for which $d'_{j,n}$ is equal for all values of j. Because of the presence of the components (w) and (c), the values across the scales are not completely identical, and an edge signature metric needs to be defined, e.g. by the formula:

$$b_p(n) = \frac{\text{abs}(\text{mean}[d'(n)])}{std[d'(n)]} \quad \{\text{equation } 33\}$$

$b_p(n)$ represents the degree to which an edge is present at point n along the time axis. The mean and standard deviation (std) functions are calculated for all of the scales j at each point n. Thus, an edge can be defined as a point (or data point) corresponding to the instant n at which $b_p(n)$ is greater than a threshold $t_p$. This method makes it possible to identify/locate any sudden transition, even of minor amplitude, that satisfies the above criteria. An additional criterion for selecting an edge from amongst the transitions can be used so as to retain only those transitions that present the greatest amplitude, for example by using the formula:

$$b_m(n) = \frac{\text{abs}(\text{mean}[d'(n)])}{wrms[i_1, n, 2^{J_{edge}}]} \quad \{\text{equation } 34\}$$

An edge is a transition that exceeds background noise distinctly. The above equation normalizes the amplitude of an edge by the energy of the data set in a window of position n and of size $2^{j_{edge}}$. The detected edge thus corresponds to a data point at instant n satisfying the edge signature criteria and of amplitude $b_m(n)$ that is greater than the threshold $t_m$, which corresponds to the following two equations:

$$b_{true}(n)=(b_p(n)>t_p)^\frown(b_m(n)>t_m) \quad \{\text{equation } 35\}$$

$$b'(n)=b'(n-1)+\text{mean}[d'(n)]b_{true}(n) \quad \{\text{equation } 36\}$$

The initial value of b' is zero. A modified data set $i_2(n)$ is obtained by subtracting the edge component:

$$i_2(n)=i(n)-b'(n) \quad \{\text{equation } 37\}$$

Operation OP3: Separating Out Random Noise

The data set $i_2(n)$ is expanded by the Haar wavelet using the stationary wavelet transform (SWT) at scales (−1) to (−$J_{noise}$). The constant $J_{noise}$ is selected to capture the major portion of the trend energy in $a_{-j}$ for a realistic data set. Independently of the trend distribution between D and $a_{-j}$, the vector $d_{1,k}$ contains practically no contribution from (c). Consequently, the energy in $d_{1,k}$ is essentially the noise (w). Assuming that (w) is Gaussian white noise, the energy level in $d_{1,k}$ is representative of the contribution of (w) for all of the scales. An evaluation of the energy (w) as a function of time is obtained by a windowed root mean square:

$$w_m(n)=wrms[d_1,n,2^J] \quad \{\text{equation } 38\}$$

It is assumed that the component (w) is formed by coefficients having an absolute value that is less than a threshold $p_w$, with the same threshold being applied to all of the scales:

$$dw_{j,n}=d_{j,n}(|d_{j,n}|<(w_m(n)t_w)) \quad \{\text{equation } 39\}$$

Eliminating noise usually consists in setting the smallest coefficient of d to zero prior to reconstruction. On the contrary, when it is desired to isolate the noise, the larger coefficients of d and a are set to zero prior to reconstruction (cf. equation 12).

The edge component is based on the above-described estimate calculation b', but corrected so that its initial value is the initial value of the data set without (w) and (s):

$$b(n)=b'(n)+i_2(0)-w(0) \quad \{\text{equation 40}\}$$

The trend component is constituted by redundant data after (s), (w), and (b) have been removed:

$$c(n)=i(n)-s(n)-w(n)-b(n) \quad \{\text{equation 41}\}$$

Other methods could be used for isolating the noise component.

EXAMPLE

Figure 8:
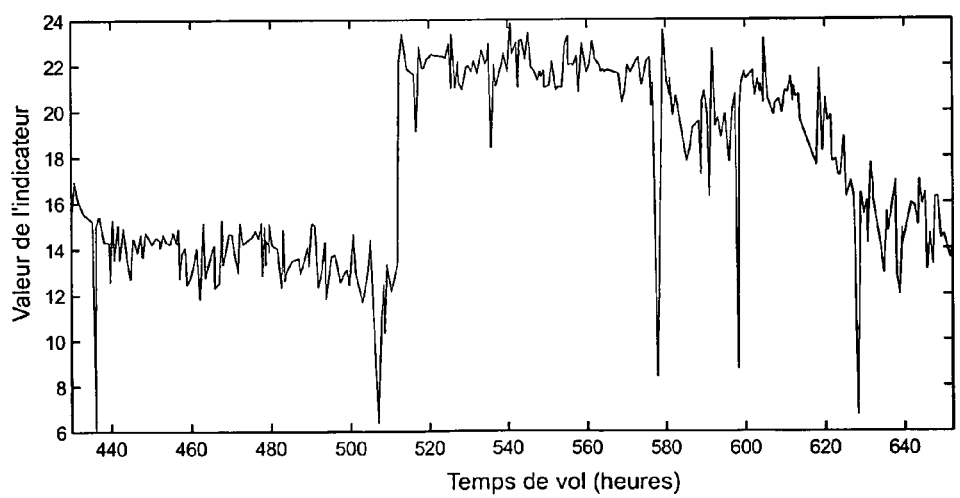
FIG. 8 is a graph showing the variations in a first indicator.
Figures 9A, 9B, 9C, 9D:
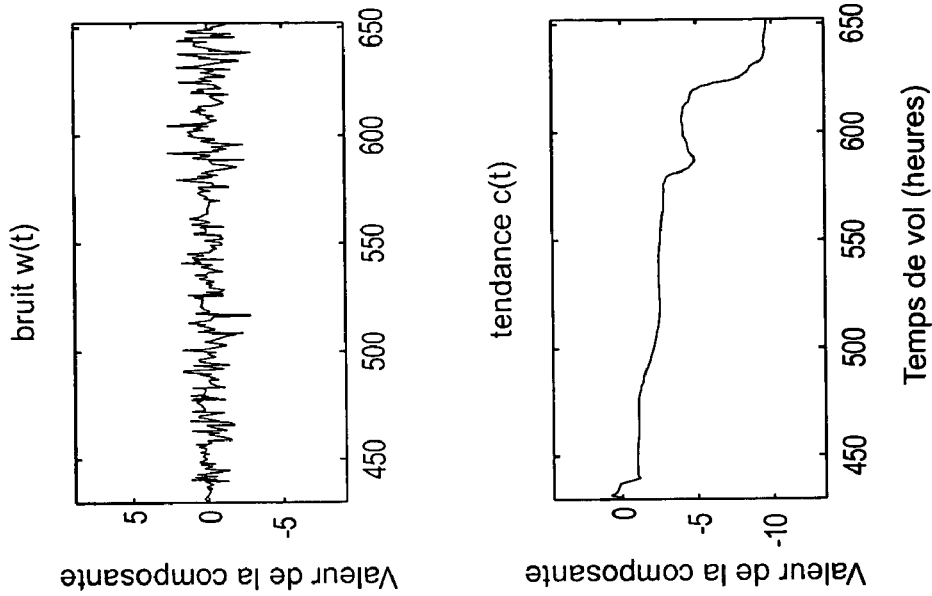
FIGS. 9A to 9D are four graphs showing respectively from left to right and top to bottom, the variations in the four components (s), (w), (b), and (c) extracted from said indicator.
Figure 11A:
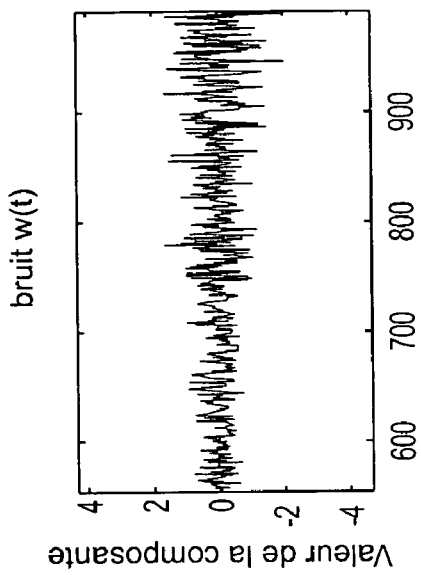
FIGS. 11A to 11D are four graphs showing respectively from left to right and top to bottom, the variations in four components (s), (w), (b), and (c) extracted from said indicator.
Figure 11B:
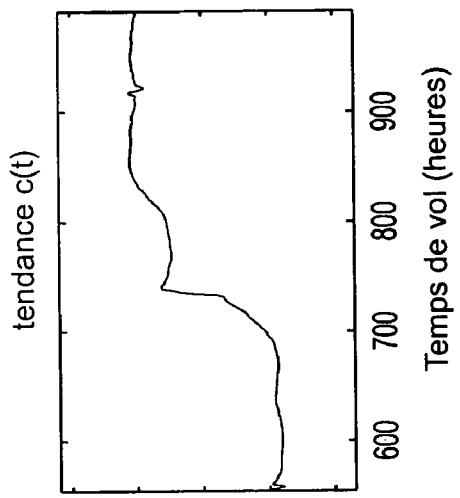
Figure 11C:
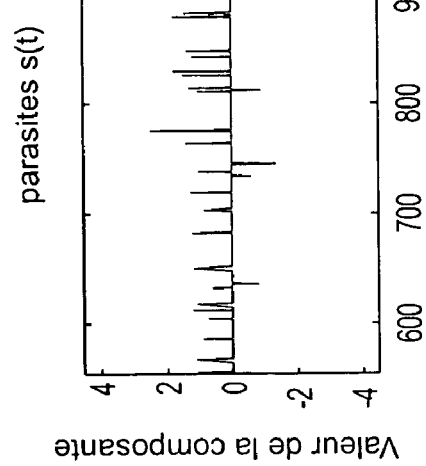
Figure 11D:
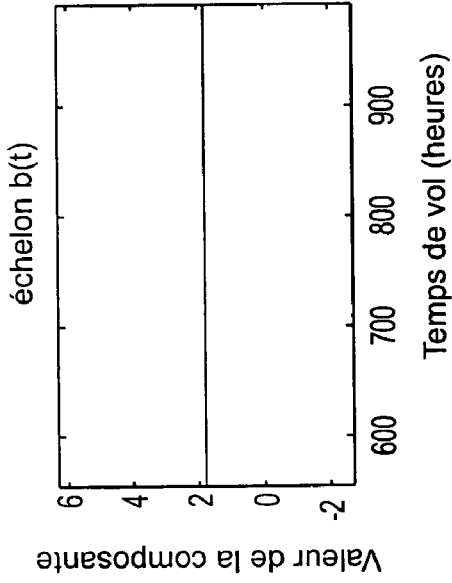

A test has been performed using the RMS indicator of vibration of an intermediate gear in a left ancillary gearbox of a Super Puma AS332L2 helicopter, for which the variation is shown in FIG. 8 and for which the respective variations of the four components are shown in FIGS. 9A to 9D. During the period corresponding to the analyzed data set, the bolts securing the intermediate gearwheel were loosened. As a consequence, the gearwheel had an "wobbling" rotary trajectory damaging the tooth profiles of the intermediate gearwheel and of the adjacent gearwheels.

After about 514 hours of flight, the main gearbox (MGB) was dismantled for programmed maintenance. This required both ancillary gearboxes to be removed and then put back on the new MGB. An edge can clearly be seen in the graph showing variation in the RMS indicator at the time of the overhaul.

The RMS indicator of an adjacent mechanical component, a hydraulic pump gearwheel, was also analyzed (cf. FIGS. 15A and 15B). The data set given by that graph is taken from a period later than the period corresponding to the graph of FIG. 8, and it covers the end of the period during which a fault propagated. The overhaul after 514 hours of flight is not included in this data. The indicator shows a clear trend leading to breakage of the part (at about 1000 hours of flight). A clear transition appears in the graph at about 735 hours of flight. The transition is nevertheless continuous, thus being illustrative more of a trend than of an edge or jump.

The parameter values used for the calculations for separating the indicator components were as follows:

$J_{edge}=J_{noise}=4$; $t_p=10$; $t_m=2$;

$t_s=2$; $t_w=5$; $L_s=7$

Trend Analysis

Rather than detecting that an indicator has exceeded a threshold, it is possible to detect the process of gradual change in the expected value of the indicator. Deterioration in the component of a mechanism leads to detectable fluctuations in indicator values over time. Trend analysis amounts to parameterizing indicator fluctuations and it consists in second level parameterization of the acquired measurement data.

For measurement data acquired in flight at regular intervals, the interval between each indicator value in terms of flight time is substantially uniform. When the interval is not uniform, for example because data is missing due to a sensor failure, then the indicator data series can be interpolated with a smoothing function and then resampled.

Separating the Components of an Indicator

As described above, the indicator is subdivided into four components. Jumps/edges are detected as discontinuities in an indicator data sequence, whereas white noise and trends are separated by using wavelets, and outliers are extracted from noise.

Non-Parametric Trend Analysis (Operations OP4 to OP6)

Trend analysis of a signal x is performed by a continuous wavelet transform (CWT) using the Haar wavelet. This corresponds to linear regression of a sliding window. The size of the window is given by the scale coefficient j, such that the size of the window in which linear regression is performed is equal to $2^j$. Consequently, a small value for j captures fast fluctuations, whereas a large value for j serves to capture lower trends. In order to detect increasing and decreasing trends associated with mechanical deterioration, it is necessary to use a plurality of values for j. This produces a matrix $D/d_j^{(x)}{}_{(n)}$ of scale coefficients, the matrix having dimensions N×J:

$$d_j^{(x)}(n) = \sum_k x(n)\psi_{j,k}(n) \quad \{\text{equation 49}\}$$

$$\psi(t) = \delta(t) - \delta(t-1) \quad \{\text{equation 50}\}$$

$$\psi(t) = 2^{\frac{j}{2}}\psi(2^j t) \quad \{\text{equation 51}\}$$

FIG. 7 shows how wavelet scales d1 to d4 serve to detect and time an edge in the input data: the amplitudes of these four coefficients are substantially greater than their respective mean values at a common time (corresponding to FIG. 7 substantially to 250 hours flying time).

Figure 13:
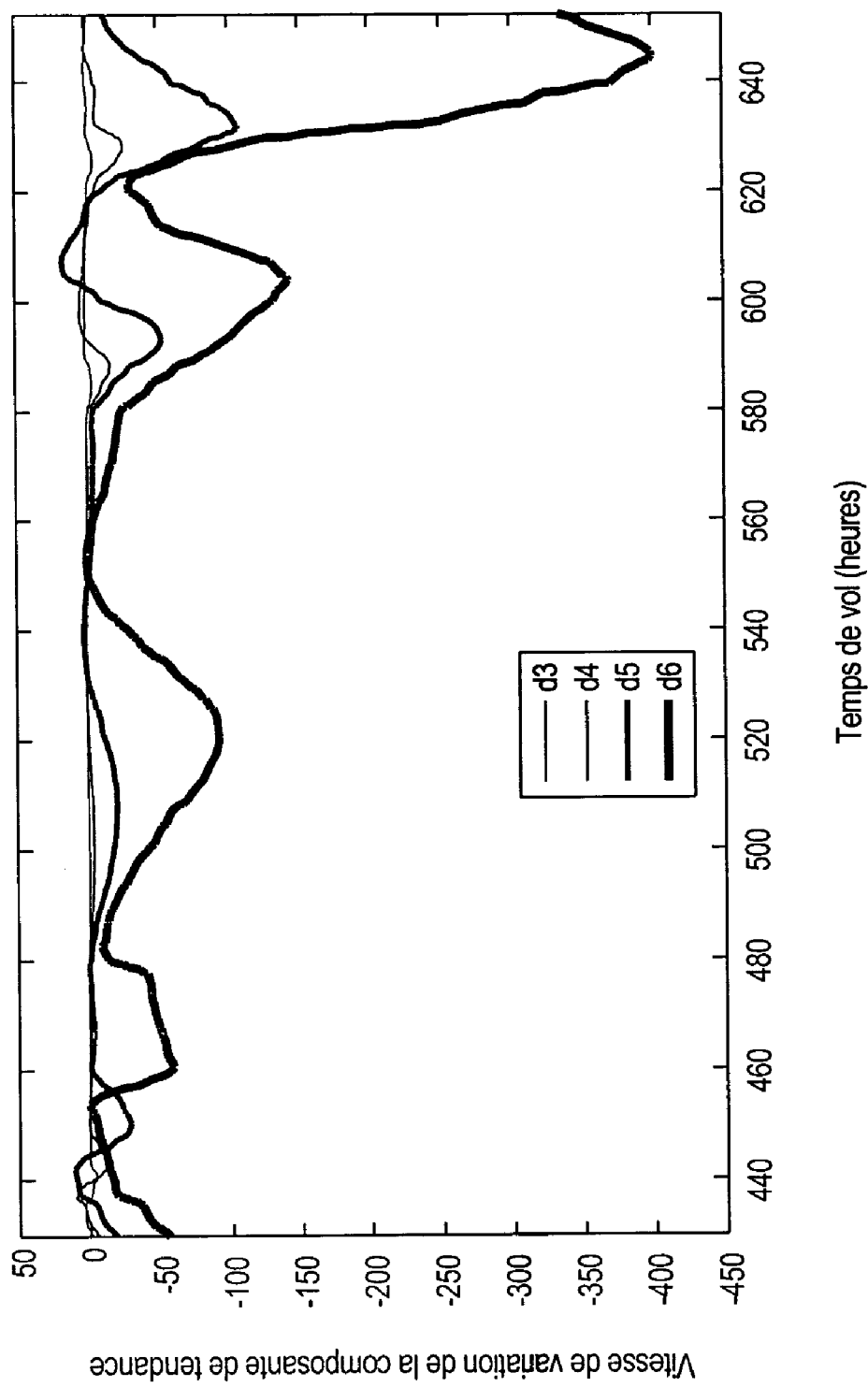
FIG. 13 is a graph showing respective variations during the same period of four scale factors d3 to d6 associated with the trend component (c) of said indicator and representative of the rate of variation of said component.

FIG. 13 shows how the wavelet scales d3 to d6 respond to slow or rapid variation in trend data. The coefficients d1 and d2 are not used since their values are substantially zero throughout the entire period analyzed.

Each of the curves shown in these figures corresponds to variation over the analysis period in the rate of variation (derivative) of the trend component: d3 corresponds to "local" variation in this component in a window of eight successive points.

This coefficient d3 corresponds to a filter $h_1^{(3)}=[-1,-1,-1,-1,1,1,1,1]$; d4 to d6 corresponds respectively to local variations calculated using windows of sixteen, thirty-two, and sixty-four successive points.

In FIG. 13 there can be seen a substantial increase—in absolute value—in the coefficients d4 to d6 at the end of the analyzed period, and around 640 hours of flying time.

The Appearance of Variations Over Time of an Indicator and Its Components

FIGS. 14 to 16 show respectively variations that are "normal", that involve an edge, and that involve a trend (an increase) in example indicators.

Detecting a Fault

For certain portions of a mechanism, such as engines, main shafts, and rotors, overall indicator values (data) can give good diagnostic results directly, preferably after initially subtracting interference or outlier data (s) (cf. FIG. 17). The result of this subtraction can then be applied directly to a classification system which compares the observations with thresholds, that may be predetermined or that are determined during a training stage.

For those components of a mechanism that are not adapted to comparison with fixed thresholds, trend measurements are used. This is done by analyzing a rate of variation for the trend component (c) of the indicator, as shown in FIG. 16. A progressive increase or decrease in the value of an indicator is isolated in this component (c). Trend analysis of this component thus indicates whether the expected value for the indicator is stationary or fluctuating.

Measurements made in flight or on the ground include a certain level of random noise. Nevertheless, a regular increase in the level of noise indicates deterioration of a mechanical component or a measurement component. To estimate the level of noise at each point of a sample of successive data points, a windowed root mean square operation is performed that calculates (operation OP3) the energy of an indicator or signal $\underline{x}$ at the point (at instant) $\underline{n}$ by using a window. Once the noise energy level has been calculated, the rate of variation of said level can be examined (operations OP4 and OP7) in the same manner as for the trend component (c).

Edges or steps in measurement data or indicators typically represent maintenance operations. The presence of steps make it difficult to detect faults by making comparison with predetermined thresholds, since as a general rule it is necessary to perform training again after each occurrence of a step. When an edge is detected, an operator/user of the monitoring system must be alerted or automatic inspection of the history of the rotorcraft mechanism must be undertaken to verify that a maintenance operation really did occur at the time (date and time) of the step (operation OP6). If no maintenance operation is recorded for that time, then the edge must be considered as revealing a potential mechanical breakdown.

Trend analysis (operations OP5 and OP8) serves to associate an observed set of indicator fluctuations with the characteristics of various types of fault. This makes it possible to identify a type of fault more precisely, and also to make a prediction by detecting the state of advance that is reflected by the current observations relative to a known deterioration process.

A test was undertaken using training data derived from measurements on board AS332 helicopters. Data histories including observed faults were collected and the propagation periods of the documented faults were isolated. Data series were selected randomly from periods outside those containing known faults in order to constitute histories—or cases—that were fault-free; each of the entries 1 to 21 in the table below is the result of measurements taken on different helicopters.

The faulty states (cases No. 1 to No. 14) correspond to loosening of bolts for securing an intermediate gearwheel. It is generally difficult to detect such a fault, unlike an unbalance fault on a shaft, since the degradation of a gearwheel does not lead to any significant increase in vibratory energy.

The preferred indicators for detecting this type of fault are the modulation side bands and the residual energy of the gearwheel. When the gearwheel is rotating in unbalanced manner, modulation appears between the frequency of rotation of the shaft and the meshing frequency of the teeth of the gearwheel: modulation side bands appear on both sides of the recording frequency, at a distance corresponding to the speed of rotation of the gearwheel. With increasing unbalance, the energy in the modulation side bands also increases.

A gearwheel vibration signal typically contains high levels above background noise at harmonics of the meshing frequency. The residual energy indicator is the total energy of the signal after all the harmonics of the meshing frequency have been removed, and as a result including the background noise. The distributed damage to the gearwheel caused by its unbalance rotation leads to an increase in this energy.

In the table below, the "duration" column contains the duration in flying time hours for each of the cases analyzed. Fault case No. 6 presents a duration that is too short to enable trend detection to be performed, since a significant length of training time is needed to learn the dynamic variation thresholds for each indicator.

The column "HUMS" contains the results of fault detection by a known monitoring system making use of thresholds obtained by traditional training. Four cases (No. 1, No. 3, No. 12, No. 14) containing a fault were not detected by the known diagnostic system, and were discovered by alarms or by inspections. Case No. 7 was discovered by the operator inspecting the indicators and the signals.

The thresholds associated with the rates of variation in the trend component were determined from fluctuation envelopes for cases 17 to 20: the maximum and minimum thresholds for each indicator scale factor were set at 120% of the corresponding extreme value encountered for cases 17 to 20. The scale factors d3 to d8 were selected for analyzing these trend fluctuations.

The column headed "Trend A" gives the results of detection making direct use of the CWT, thereby giving fluctuation levels sensitive to the amplitude of the indicator.

The column headed "Trend B" gives the results of detection using CWT, normalized by the energy of white noise (w) and outliers (s). This normalization serves to correlate trend and indicator amplitude. A trend corresponding to an increase of 10% then gives an identical result regardless of the amplitude of the indicator, unlike the method that leads to the results of the "Trend A" column.

| Case | State | Duration | HUMS | Trend A | Trend B |
|---|---|---|---|---|---|
| 1 | Faulty | 86.03 | No | Yes | Yes |
| 2 | Faulty | 372.80 | Yes | Yes | Yes |
| 3 | Faulty | 336.92 | No | Yes | Yes |
| 4 | Faulty | 78.52 | Yes | Yes | Yes |
| 5 | Faulty | 267.37 | Yes | No | Yes |
| 6 | Faulty | 50.92 | Yes | No | No |
| 7 | Faulty | 194.47 | n/a | Yes | Yes |
| 8 | Faulty | 251.02 | Yes | Yes | Yes |
| 9 | Faulty | 336.88 | Yes | Yes | Yes |
| 10 | Faulty | 232.45 | Yes | Yes | Yes |
| 11 | Faulty | 77.43 | Yes | Yes | Yes |
| 12 | Faulty | 49.44 | No | Yes | No |
| 13 | Faulty | 195.99 | Yes | Yes | Yes |
| 14 | Faulty | 36.53 | No | Yes | Yes |
| 15 | Healthy | 877.78 | n/a | No | No |
| 16 | Healthy | 2019.85 | n/a | No | No |
| 17 | Healthy | 1608.58 | n/a | No | No |
| 18 | Healthy | 1479.90 | n/a | No | No |
| 19 | Healthy | 1093.09 | n/a | No | No |
| 20 | Healthy | 218.50 | n/a | No | No |
| 21 | Healthy | 148.74 | n/a | No | No |

Combining the results of trend analysis methods A and B using an "OR" operator leads to only one case not being detected: this is case No. 6, and that can be explained because of a lack of data: the use of scales 3 to 8 means that trends are evaluated with windows having eight to 256 points, corresponding roughly to the number of points available; the duration of the available signal in this particular case is too short to enable it to be analyzed effectively.

In another implementation, the results of two such trend analysis methods can be presented as input to a classifier such as a neural network having radial basis functions, so as to improve the effectiveness with which faults are detected (after the neural network has been trained) on the basis of wavelet transform calculations applied to the components of the analyzed data, in particular on the basis of calculations applied to the trend component.

The invention claimed is:

1. A method of analyzing variations in an indicator of the behavior of a mechanism, the method being characterized in that it comprises the following operations:
   extracting noise and any discontinuities from the indicator in order to obtain a trend;
   comparing variations in the trend with one or more reference values;
   indicating a fault of the mechanism as a function of the result of the comparison;
   wherein, in order to extract any discontinuities, the following operations are also performed:
   searching for and subtracting out any outlier data in the indicator data; and
   extracting any edge data from the data obtained from said searching operation.

2. A method according to claim 1, in which, in order to find the times of the outlier data:
   a moving median value of the indicator data is subtracted from the indicator data in order to obtain noisy data; and
   the time is identified for which the ratio of the amplitude of the noisy data to the indicator data level is greater than a threshold.

3. A method according to claim 1, in which, in order to identify the presence of an edge in the data, variations in the scale coefficients corresponding to a wavelet transform of variations in the data are analyzed.

4. A method according to claim 3, in which a potential edge is identified in the data when the ratio $b_p$ of a mean of the sale coefficients to the standard deviation of the variations of these coefficients, exceeds a first determined value $t_p$, and when the ratio $b_m$ of said mean of the scale coefficients to the level of the data exceeds a second determined value $t_m$.

5. A method according to claim 1, in which, the following operations are also performed:
   calculating the level of the noise;
   comparing variations in the level of the noise with one or more reference values; and
   indicating a fault of the mechanism as a function of the results of the comparison performed in operation.

6. A method according to claim 5, in which, in order to compare variations in the noise level with reference values, the following operations are performed:
   calculating scale variation data of a wavelet transform of the noise level variations; and
   comparing the scale variation data of the wavelet transform of the noise level with the reference values.

7. A method according to claim 3, in which use is made of the Haar wavelet and of the scale function associated with the Haar wavelet.

8. A method according to claim 1, in which, when an edge is detected, the time of the edge is compared with historical data concerning maintenance of the mechanism.

9. A method according to claim 1, in which the amplitude of the data is compared with at least one third reference value.

10. A method according to claim 4, in which a fault of the mechanism is diagnosed as a function of the results of the comparisons.

11. A method according to claim 1, further including the following successive prior operations:
    normalizing variations of the indicator with reference to simultaneous variations of an operating parameter of the mechanism; and
    then, in a training stage, determining reference values or thresholds for the rate of variation of at least one component of the indicator from the variations of the indicator during a period of operation without any fault of the mechanism.

12. A method according to claim 11, in which the normalization operation includes parametric modeling of the indicator or of measurements from the indicator is extracted.

13. A method according to claim 11, in which the normalization operation comprises filtering indication variation data.

14. A method according to claim 1, in which the mechanism is a rotorcraft transmission mechanism, the indicator is derived from vibration measurements performed on the rotorcraft in flight, and the operating parameter is the air speed of the rotorcraft.

15. A method according to claim 1, in which, in order to compare the trend variations with reference values, the following operations are performed:
    calculating scale variation data of a wavelet transform of the trend data; and
    comparing the scale variation data of the wavelet transform of the trend data with reference values.

16. Apparatus for diagnosing a mechanism as a function of data generated from vibration measurements performed on the mechanism, the apparatus being characterized in that it is programmed to perform the operations of a method comprising the following operations:
    extracting noise and any discontinuities from the indicator in order to obtain a trend;
    comparing variations in the trend with one or more reference values;
    indicating a fault of the mechanism as a function of the result of the comparison;
    wherein, in order to extract any discontinuities, the following operations are also performed:
    searching for and subtracting out any outlier data in the indicator data; and
    extracting any edge data from the data obtained from said searching operation.

* * * * *